US012304205B2

(12) United States Patent
Maeda et al.

(10) Patent No.: US 12,304,205 B2
(45) Date of Patent: May 20, 2025

(54) PRINTING APPARATUS

(71) Applicant: BROTHER KOGYO KABUSHIKI KAISHA, Nagoya (JP)

(72) Inventors: Atsushi Maeda, Nagoya (JP); Tsubasa Horie, Chiryu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 216 days.

(21) Appl. No.: 18/323,836

(22) Filed: May 25, 2023

(65) Prior Publication Data

US 2023/0382110 A1 Nov. 30, 2023

(30) Foreign Application Priority Data

May 27, 2022 (JP) ................................ 2022-087138

(51) Int. Cl.
*B41J 2/14* (2006.01)

(52) U.S. Cl.
CPC ................................ *B41J 2/14201* (2013.01)

(58) Field of Classification Search
CPC ................ B41J 2/14201; B41J 2/04541; B41J 2/04546; B41J 2/04588; B41J 2/04581
See application file for complete search history.

(56) References Cited

U.S. PATENT DOCUMENTS

2008/0122888 A1 5/2008 Suzuki
2019/0126611 A1 5/2019 Lahiri et al.

FOREIGN PATENT DOCUMENTS

JP S58-53784 Y2 12/1983
JP 2000071578 A 3/2000
JP 2001054947 A 2/2001
JP 2007190741 A * 8/2007 ............ B41J 2/2128
JP 2008126612 A 6/2008
JP 2009034925 A 2/2009
JP 2010142978 A 7/2010
JP 2011020330 A 2/2011
JP 2019512413 A 5/2019

OTHER PUBLICATIONS

Ozawa Yoshiyuki, "Printer, Image Processor, Method for Printing, and Method for Processing Image" (JP 2007190741), Aug. 2, 2007, [Best Mode: B-2-2. Internal configuration of the printer unit] (Year: 2007).*

Office Action issued May 21, 2024 in corresponding Japanese Patent Application No. 2022-087138 (with English translation), 5 pages.

* cited by examiner

*Primary Examiner* — Lisa Solomon
(74) *Attorney, Agent, or Firm* — Element IP, PLC

(57) ABSTRACT

A printing apparatus includes a first digital synthesizer configured to generate a first basic analog synthesis signal by synthesizing n (n is a natural number greater than or equal to 2) pieces of digital data, which indicating driving waveforms used to drive an energy generating element to cause a nozzle to eject liquid, and converting the same an analog signal, the n being a natural number greater than or equal to 2, an integrated signal synthesizer configured to generate an integrated analog signal by synthesizing the first basic analog synthesis signal and one or more analog waveform signals, and a separator configured to separate one of a driving waveform signal indicated by one of the n pieces of digital data and driving waveform signals indicated by the one or more analog waveform signals from the integrated analog signal.

18 Claims, 15 Drawing Sheets

FIRST SYNTHESIZED DIGITAL DATA

FIRST BASIC ANALOG SYNTHESIZED SIGNAL

SECOND SYNTHESIZED DIGITAL DATA

SECOND BASIC ANALOG SYNTHESIZED SIGNAL

FIRST SYNTHESIZED DIGITAL DATA

FIRST BASIC ANALOG SYNTHESIZED SIGNAL

SECOND SYNTHESIZED DIGITAL DATA

SECOND BASIC ANALOG SYNTHESIZED SIGNAL

PRINTING APPARATUS

REFERENCE TO RELATED APPLICATIONS

This application claims priority from Japanese Patent Application No. 2022-087138 filed on May 27, 2022. The entire content of the priority application is incorporated herein by reference.

BACKGROUND ART

The present disclosures relate to a printing apparatus configured to eject liquid.

There is known a printer configured to generate first to fourth driving pulses having different amplitudes as driving signals to drive piezoelectric elements for respective nozzles. In such a printer, the first to fourth driving pulses are continuously generated during one period of printing one pixel. In such a configuration, one of the first to fourth driving pulses is selected, and applied to a piezoelectric element for each nozzle. Then, each nozzle ejects ink by an amount corresponding to the amplitude of the driving pulse as selected, thereby a desired size of dot is formed on a recording medium.

DESCRIPTION

Four driving pulses are continuously generated within one period, but only one driving pulse is selected. Therefore, a time assigned to the three driving pulses which were not selected is a standby time for the nozzle.

According to aspects of the present disclosures, there is provided a printing apparatus including a first digital synthesizer configured to generate a first basic analog synthesis signal by synthesizing n pieces of digital data and converting the synthesized n pieces of digital data to an analog signal, each of the n pieces of digital data indicating a driving waveform used to drive an energy generating element to cause a nozzle to eject liquid, the n being a natural number greater than or equal to 2, an integrated signal synthesizer configured to generate an integrated analog signal by synthesizing the first basic analog synthesis signal and one or more analog waveform signals indicating one or more driving waveforms, respectively, and a separator configured to separate one of a driving waveform signal indicated by one of the n pieces of digital data and driving waveform signals indicated by the one or more analog waveform signals from the integrated analog signal generated by the integrated signal synthesizer.

FIGS. 4A-4D respectively illustrate examples of first to fourth tables.

FIGS. 5A-5D show examples of a driving wave.

Figure 6A:

FIG. 6A schematically shows an example of first synthesized digital data.

Figure 6B:
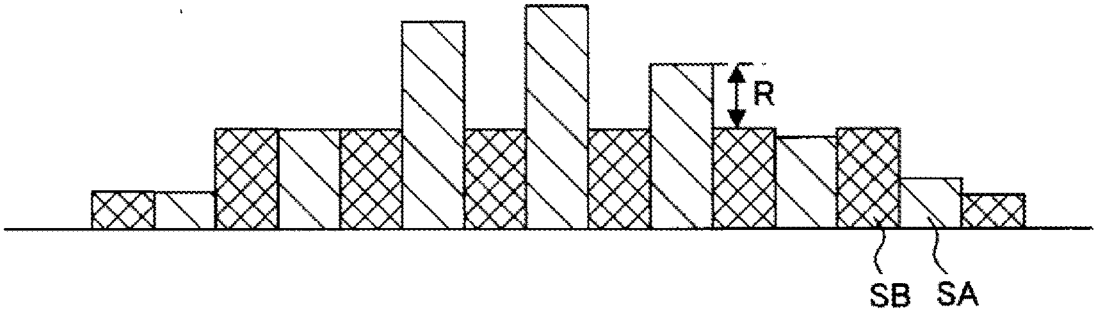

FIG. 6B schematically shows an example of a first basic analog synchronization signal.

Figure 6C:

FIG. 6C schematically shows an example of second synthesized digital data.

Figure 6D:
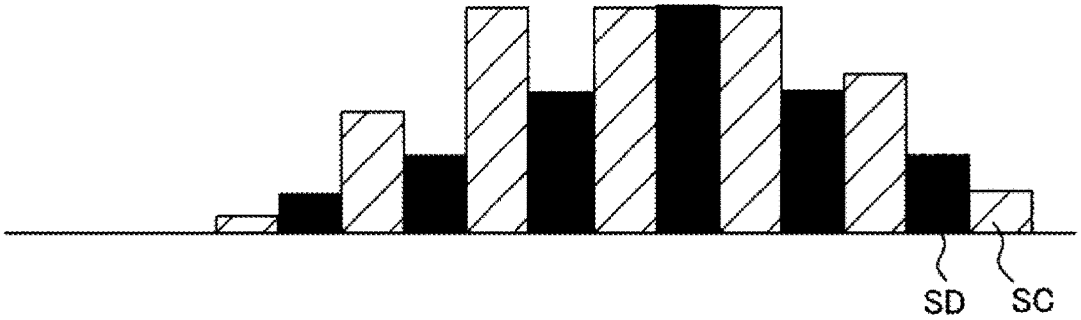

FIG. 6D schematically shows an example of a second basic analog synchronization signal.

Figure 7:
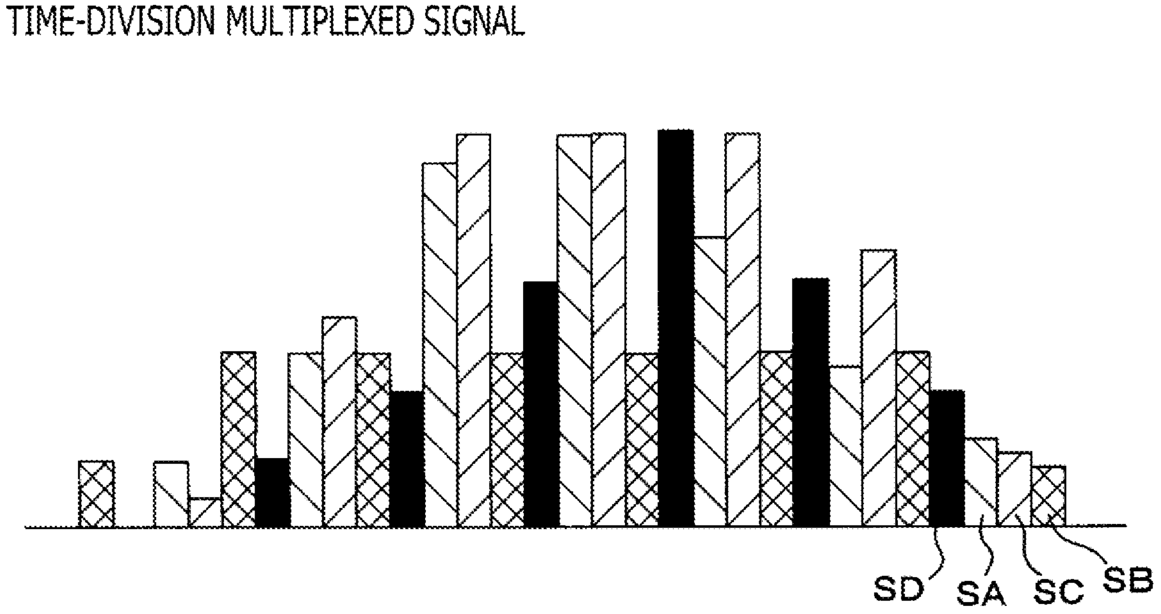
Figure 8A:
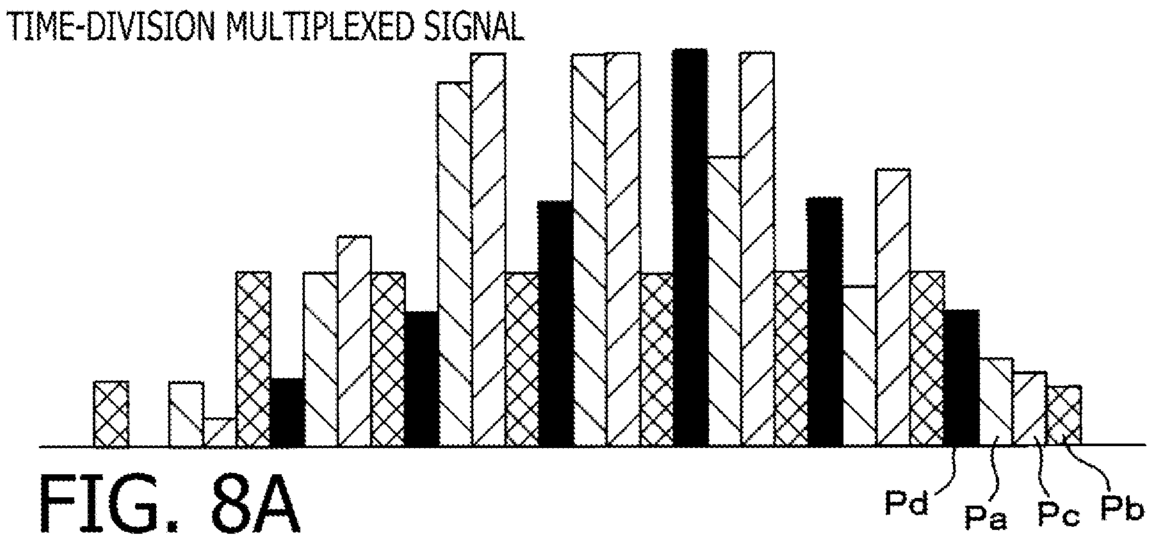
Figure 8B:
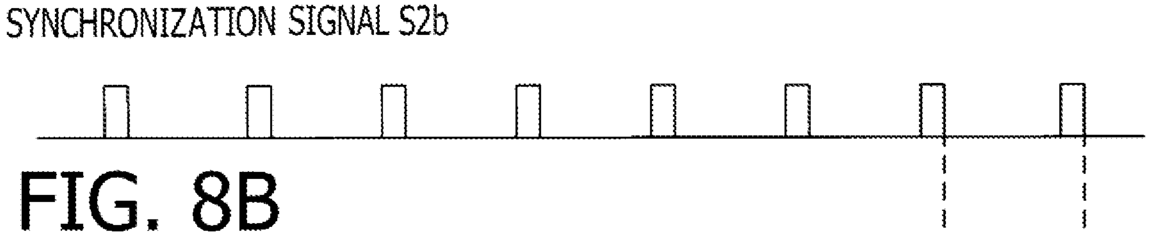
Figure 8C:
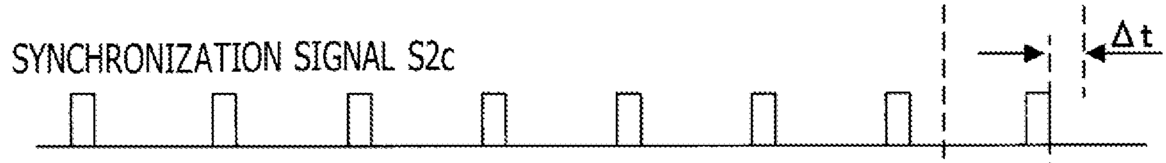
Figure 8D:
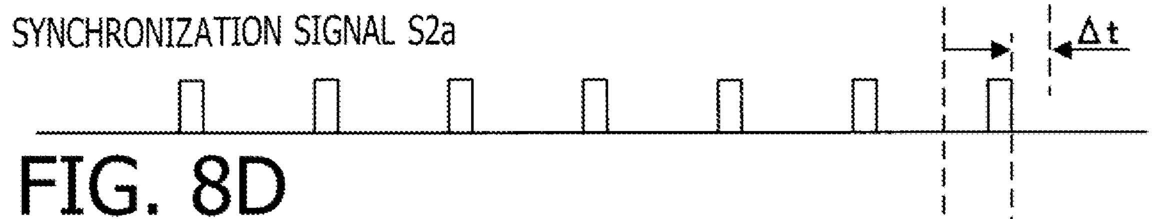
Figure 8E:
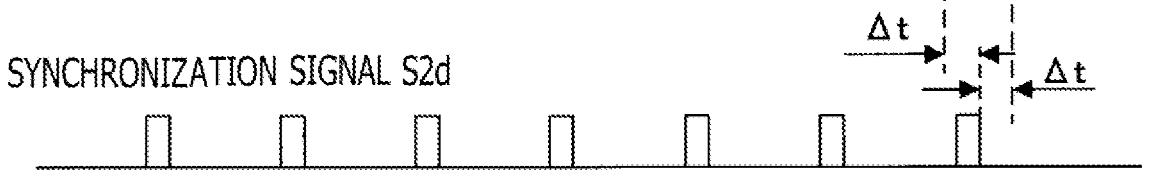
Figure 9A:
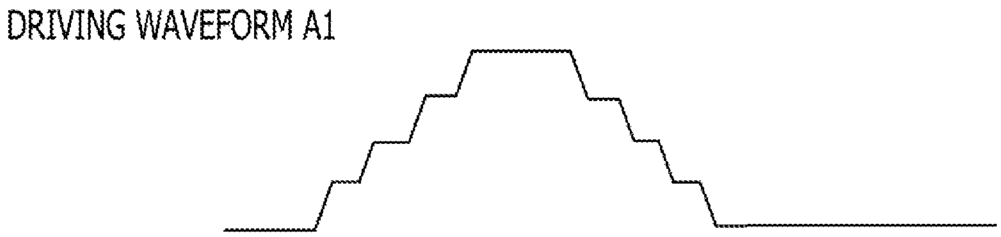
Figure 9B:
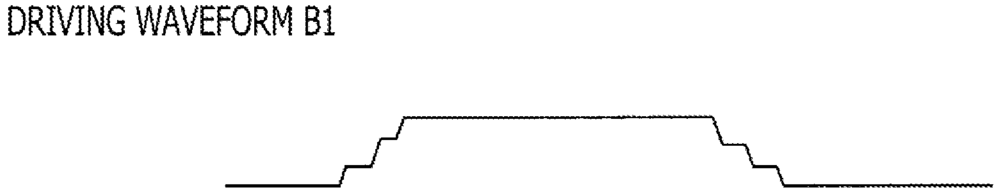
Figure 9C:
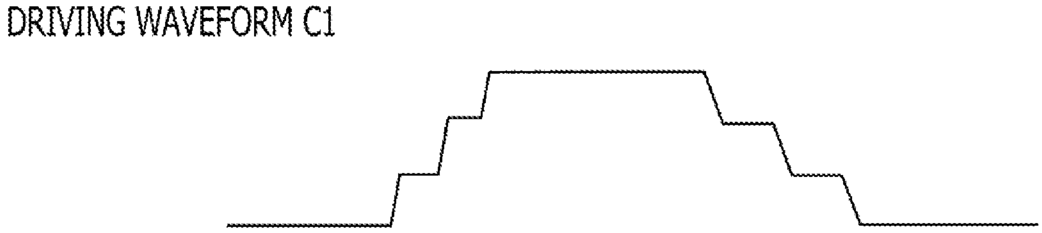
Figure 9D:
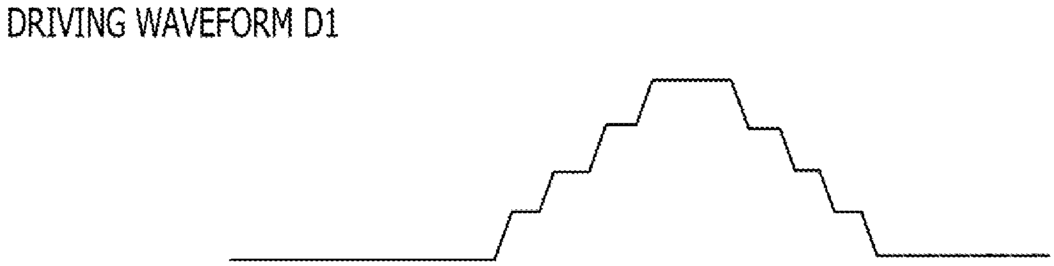

FIG. 7 illustrates an example of a time-division multiplexed signal.

FIGS. 8A-8E illustrate a relationship between the time-division multiplexed signal and synchronization signals.

FIGS. 9A-9D schematically show driving waveforms input to an actuator in accordance with an open/close state of an n-th switch.

Figure 10A:
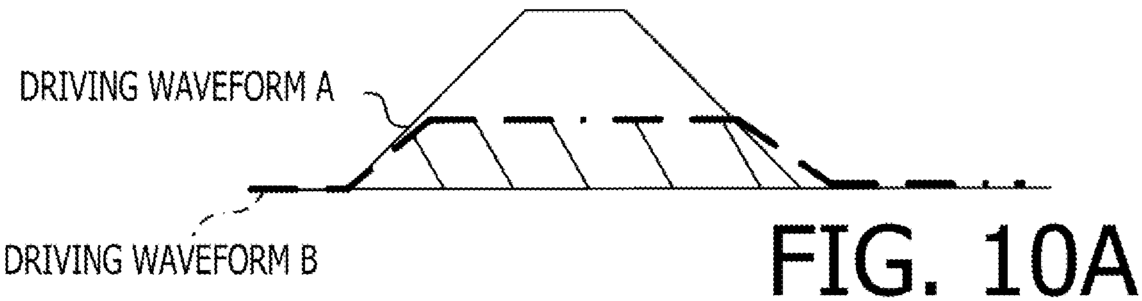
Figure 10B:
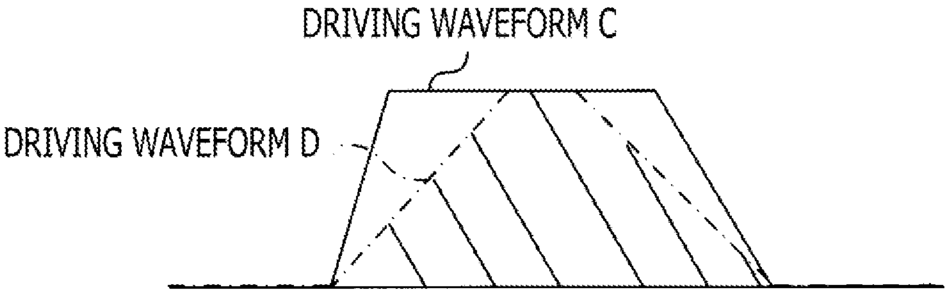

FIGS. 10A and 10B illustrate similarity of driving waveforms A and B, and similarity of driving waveforms C and D.

Figure 11:
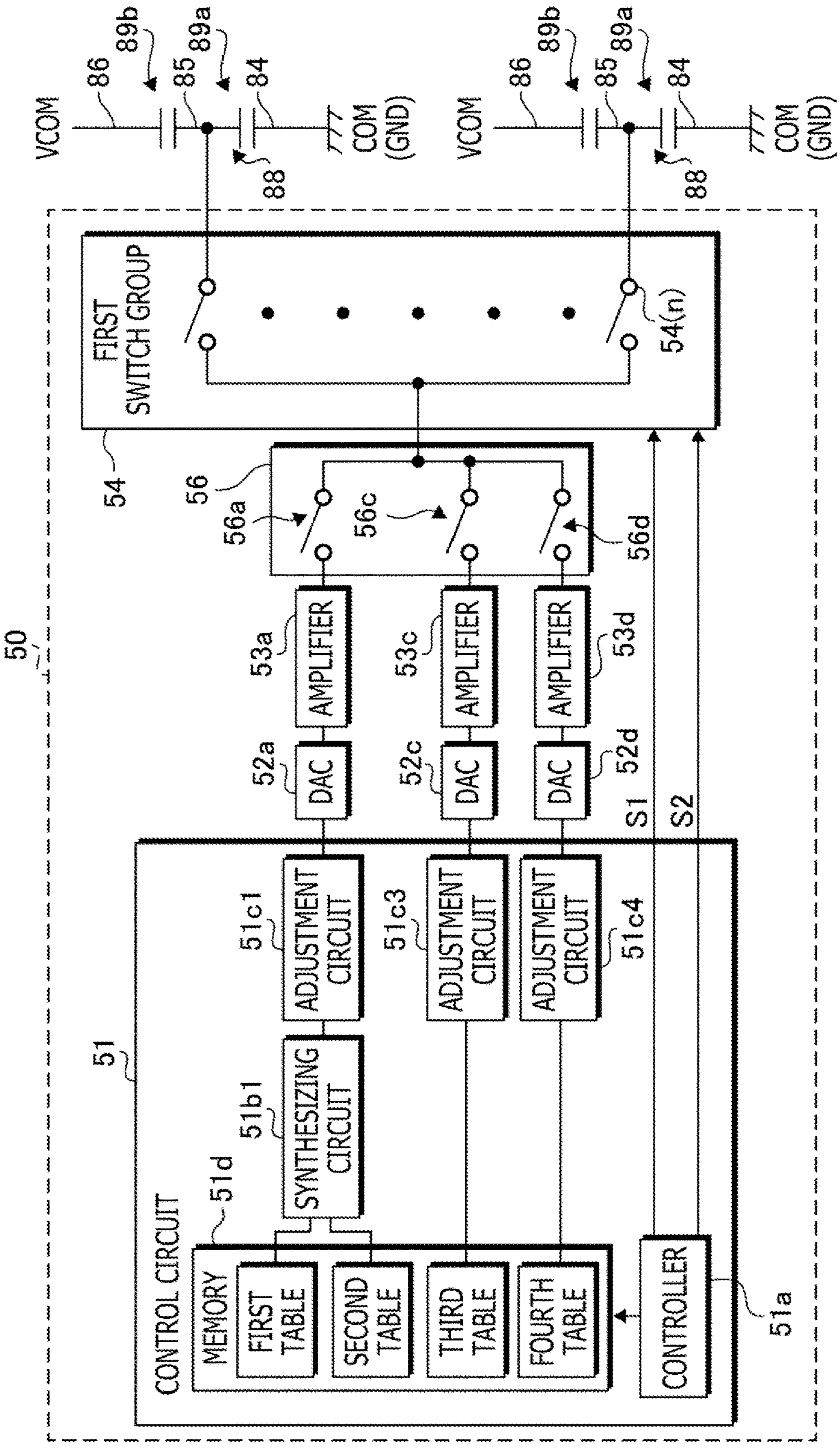

FIG. 11 is a block diagram of a control device.

Figure 12:
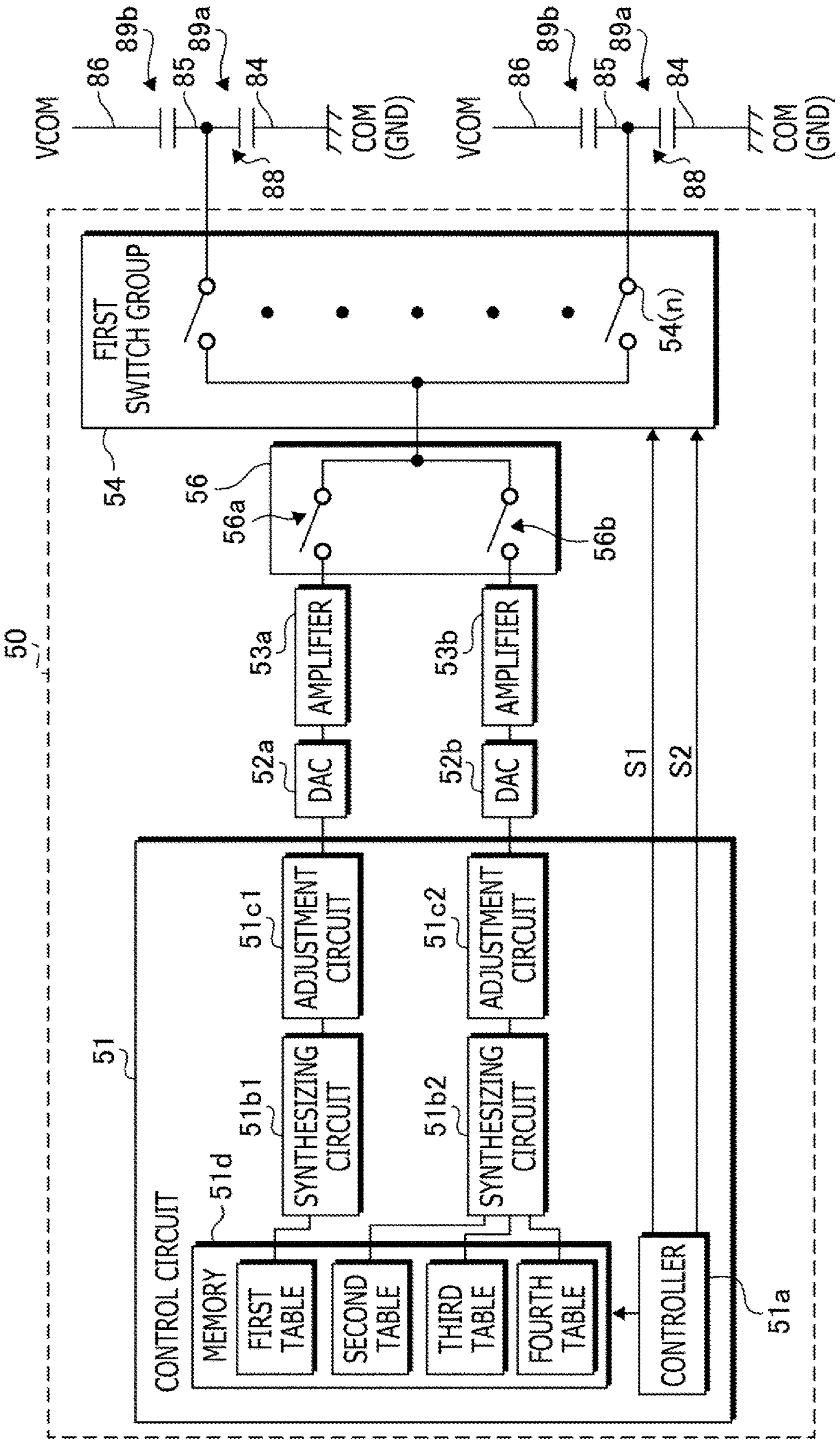

FIG. 12 is a block diagram of a control device.

Figure 13:
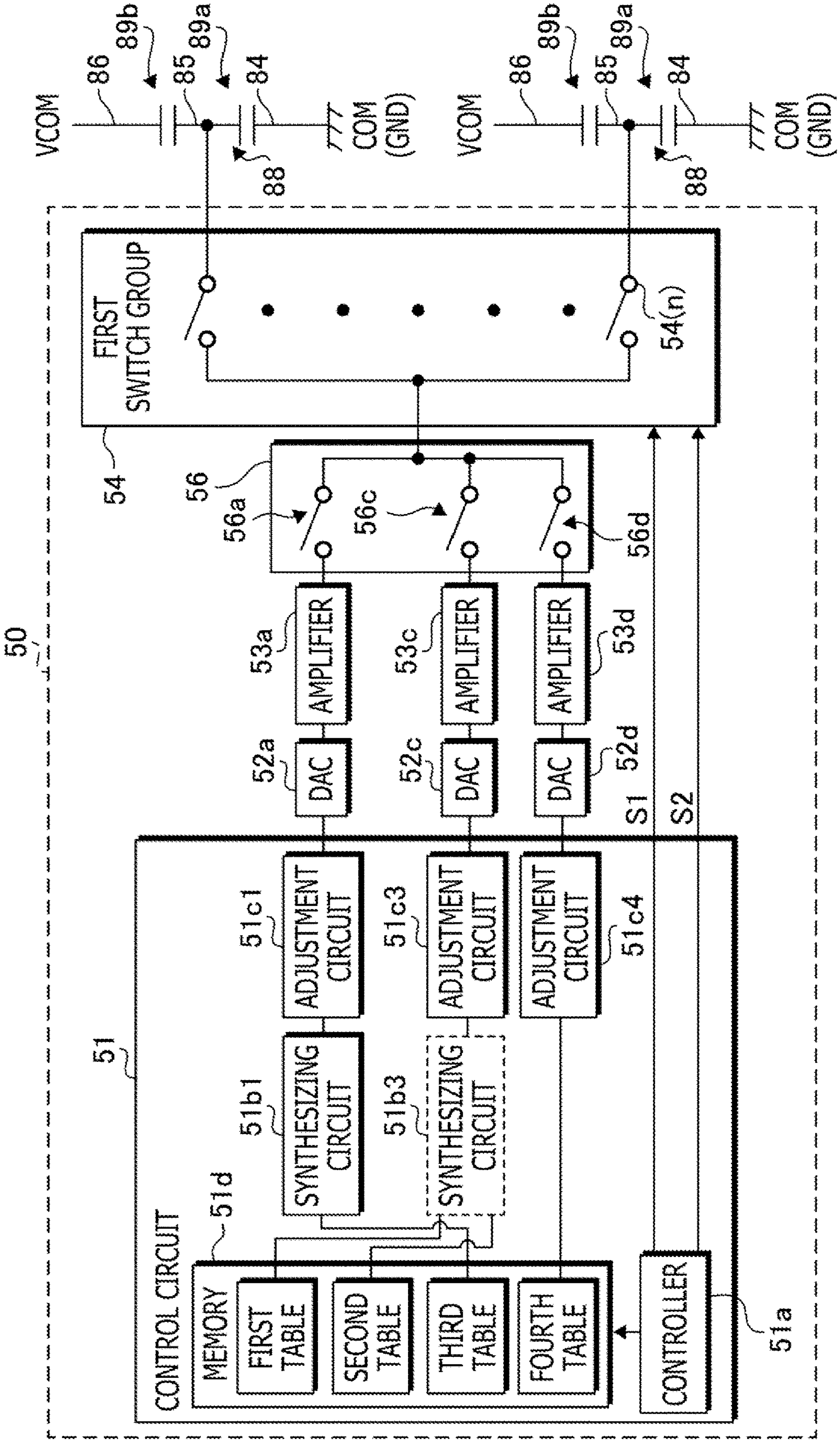

FIG. 13 is a block diagram of a control device.

Figure 14A:

FIG. 14A schematically shows an example of first synthesized digital data.

Figure 14B:
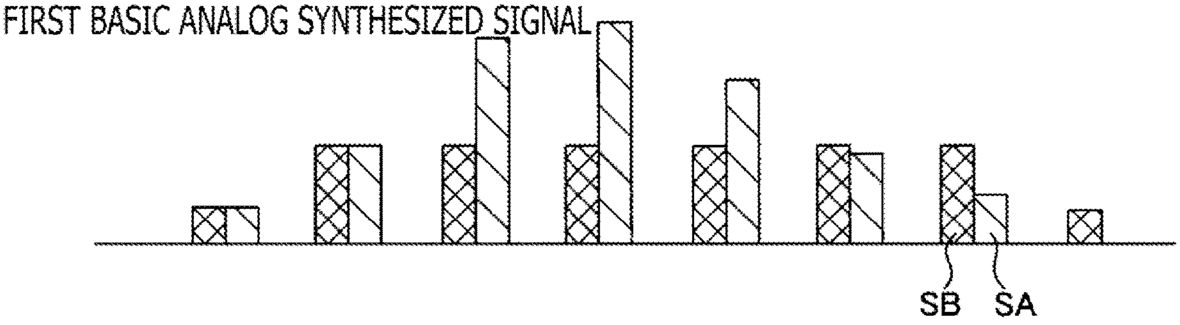

FIG. 14B schematically shows an example of a first basic analog synchronization signal.

Figure 14C:
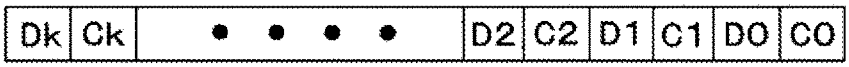

FIG. 14C schematically shows an example of second synthesized digital data.

Figure 14D:
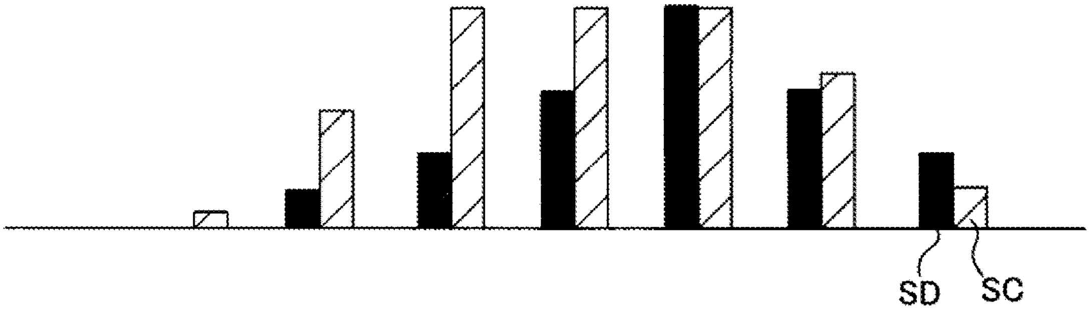

FIG. 14D schematically shows an example of a second basic analog synchronization signal.

Figure 15:
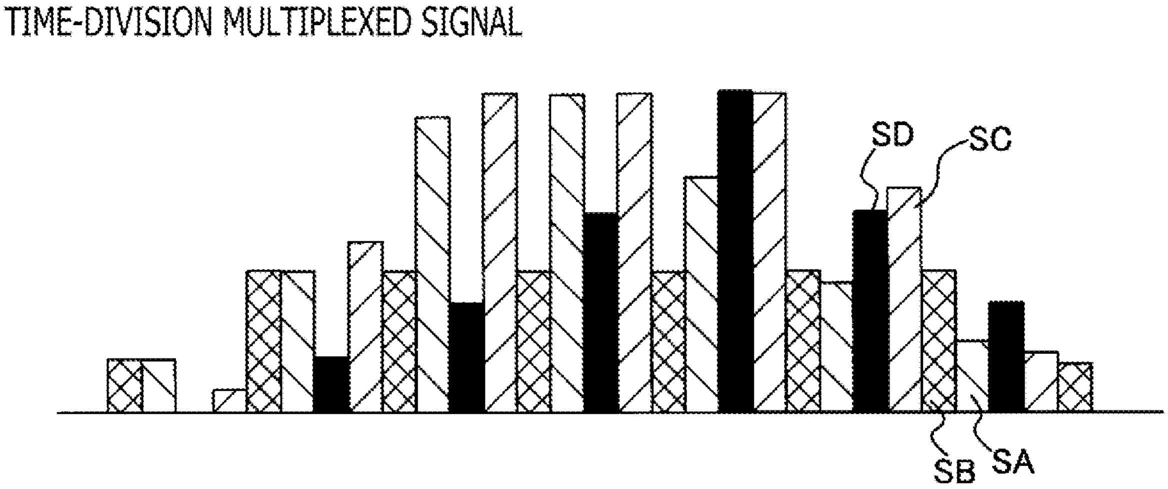

FIG. 15 illustrates an example of a time-division multiplexed signal.

Figure 1:
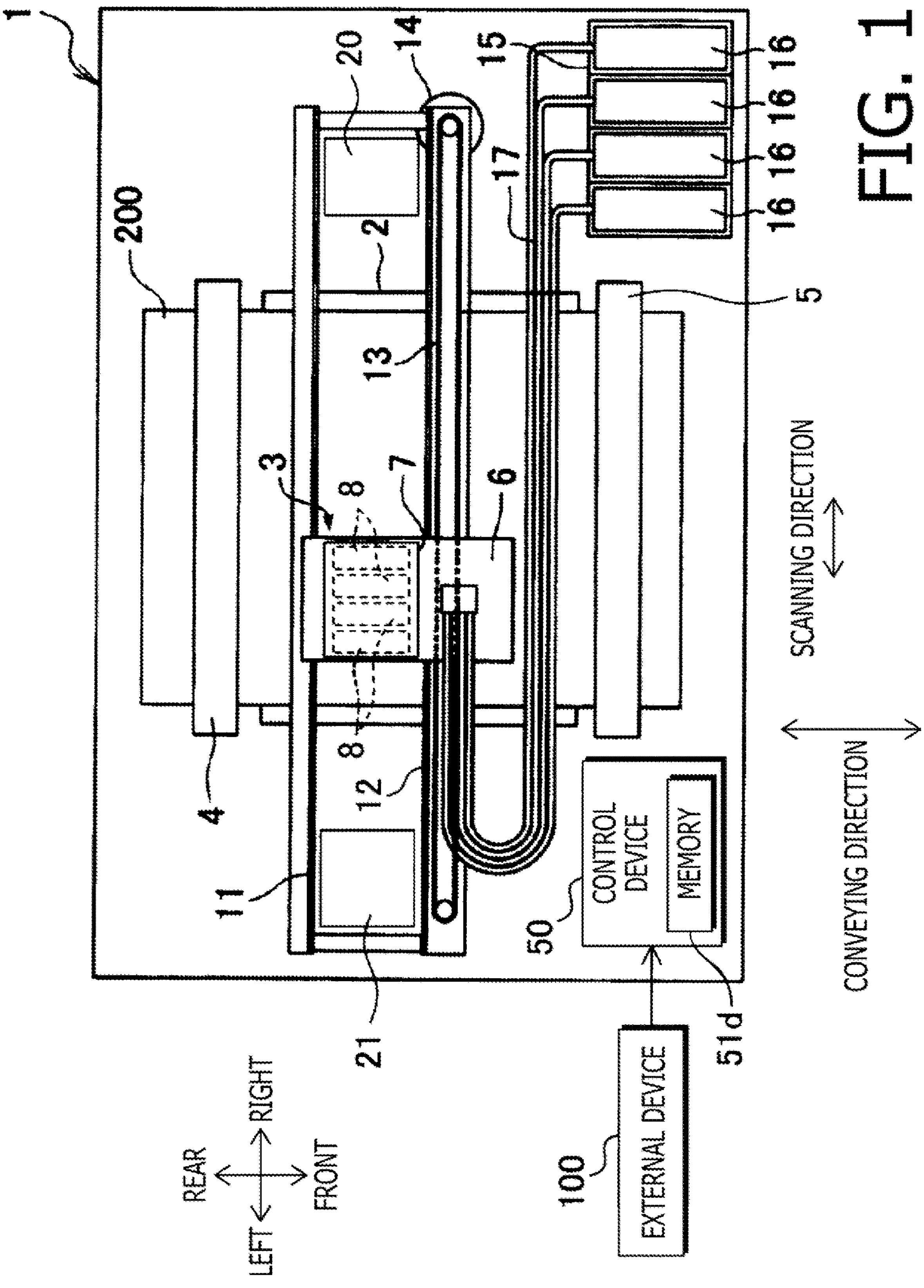
FIG. 1 is a plan view of a schematic configuration of a printing apparatus according to an embodiment.

Hereinafter, a printing apparatus 1 according to an embodiment will be described with reference to the accompanying drawings. FIG. 1 a plan view schematically showing the printing apparatus 1. In the following description, up, down, right, left directions as indicated in FIG. 1 will be referred to. It is noted that a conveying direction in which a recording medium (i.e., a printing sheet) is conveyed corresponds to a front-rear direction. Further, a right-left direction corresponds to a scanning direction, which will be described later. Although not shown in FIG. 1, a direction perpendicular to a plane of FIG. 1 is an up-down direction, which will also be referred to in the following description. The up-down direction is perpendicular to both the right-left direction and the front-rear direction. Further, in the up-down direction, a side facing a front surface of the plane of FIG. 1 corresponds to an upside of the printing apparatus 1, while a side facing a back surface of the plane of FIG. 1 corresponds to a downside of the printing apparatus 1.

As shown in FIG. 1, the printing apparatus 1 includes a platen 2, an ink ejection device 3, conveying rollers 4 and 5, and the like. On an upper surface of the platen 2, a printing sheet 200, which is an example of the recording medium according to the present disclosures, is placed. The ink ejection device 3 is configured to eject ink toward the printing sheet 200 placed on the platen 2 to record an image thereon. The ink ejection device 3 includes a carriage 6, a sub-tank 7, four inkjet heads 8, a circulation pump and the like.

On an upper side of the platen 2, two guide rails 11 and 12 extending in the right-left direction to guide the carriage 6 are provided. The carriage 6 is connected to an endless belt 13 extending in the right-left direction. The endless belt 13 is driven by a carriage-driving motor 14. As the endless belt 13 is driven, the carriage 6 moves reciprocally, as guided by the guide rails 11 and 12, in the scanning direction within an area facing the platen 2. More concretely, the carriage 6 performs, with supporting the four inkjet heads 8, a first movement to move the head from a first position to a second position, from left to right, in the scanning direction, and a second movement to move the head from the second position to the first position, from right to left, in the scanning direction.

Between the guide rails 11 and 12, a cap 20 and a flushing receptacle 21 are provided. The cap 20 and the flushing receptacle 21 are arranged on a lower side with respect to the ink ejection device 3. The cap 20 is arranged at the right end of the guide rails 11 and 12, and the flushing receptacle 21 is arranged at the left end of the guide rails 11 and 12. Alternatively, the cap 20 and flushing receptacle 21 may be arranged reversely.

The sub-tank 7 and four inkjet heads 8 are mounted on the carriage 6, and move reciprocally in the scanning direction together with the carriage 6. The sub-tank 7 is connected to a cartridge holder 15 through a tube 17. To the cartridge holder 15, one or more colors (in the present embodiment, four colors) of ink cartridges 16 are mounted. The four colors may be, for example, black, yellow, cyan and magenta.

Inside the sub-tank 7, four ink chambers are formed. The four ink chambers are configured to reserve four colors of ink supplied from the four ink cartridges 16, respectively.

The four inkjet heads 8 are arranged, on a lower side with respect to the sub-tank 7, in the scanning direction. On a lower surface of each inkjet head 8, multiple nozzles 80 (see FIG. 2) are formed. One inkjet head 8 corresponds to one color of ink and is connected to one ink chamber. In other words, the four inkjet heads 8 correspond to four colors of ink and are connected to four ink chambers, respectively.

Each inkjet head 8 is formed with an ink supplying port and an ink discharging port, which are connected to the ink chamber trough an ink path such as a tube. Between the ink supplying port and the corresponding ink chamber, a circulation pump is connected.

The ink delivered from the ink chamber by the circulation pump flows into the inkjet head 8 through the ink supplying port, and is ejected from the nozzles 80. The ink which is not ejected from the nozzles 80 returns to the ink chamber through the ink discharge port. The ink circulates between the ink chamber and the inkjet head 8. The four inkjet heads 8 eject four colors of ink supplied from the sub-tank 7 toward the printing sheet 200 with moving in the scanning direction together with the carriage 6.

As shown in FIG. 1, the conveying roller 4 is arranged upstream (backward) in the conveying direction with respect to the platen 2. The conveying roller 5 is arranged downstream (forward) in the conveying direction with respect to the platen 2. The two conveying rollers 4 and 5 are driven synchronously by a motor (not shown). The two conveying rollers 4 and 5 convey the printing sheet 200 placed on the platen 2 in the conveying direction that is perpendicular to the scanning direction. The printing apparatus 1 has a control device 50. The control device 50 includes a CPU or a logic circuit (e.g., FPGA), memory 51*d*, such as a non-volatile memory, a RAM, and the like. The control device 50 is configured to receive a print job and driving waveform data from the external device 100 and stores the same in the memory 51*d*. The control device 50 is configured to control driving of the ink ejection device 3, the conveying roller 4, and the like, based on the print job, and executes the printing process.

Figure 2:
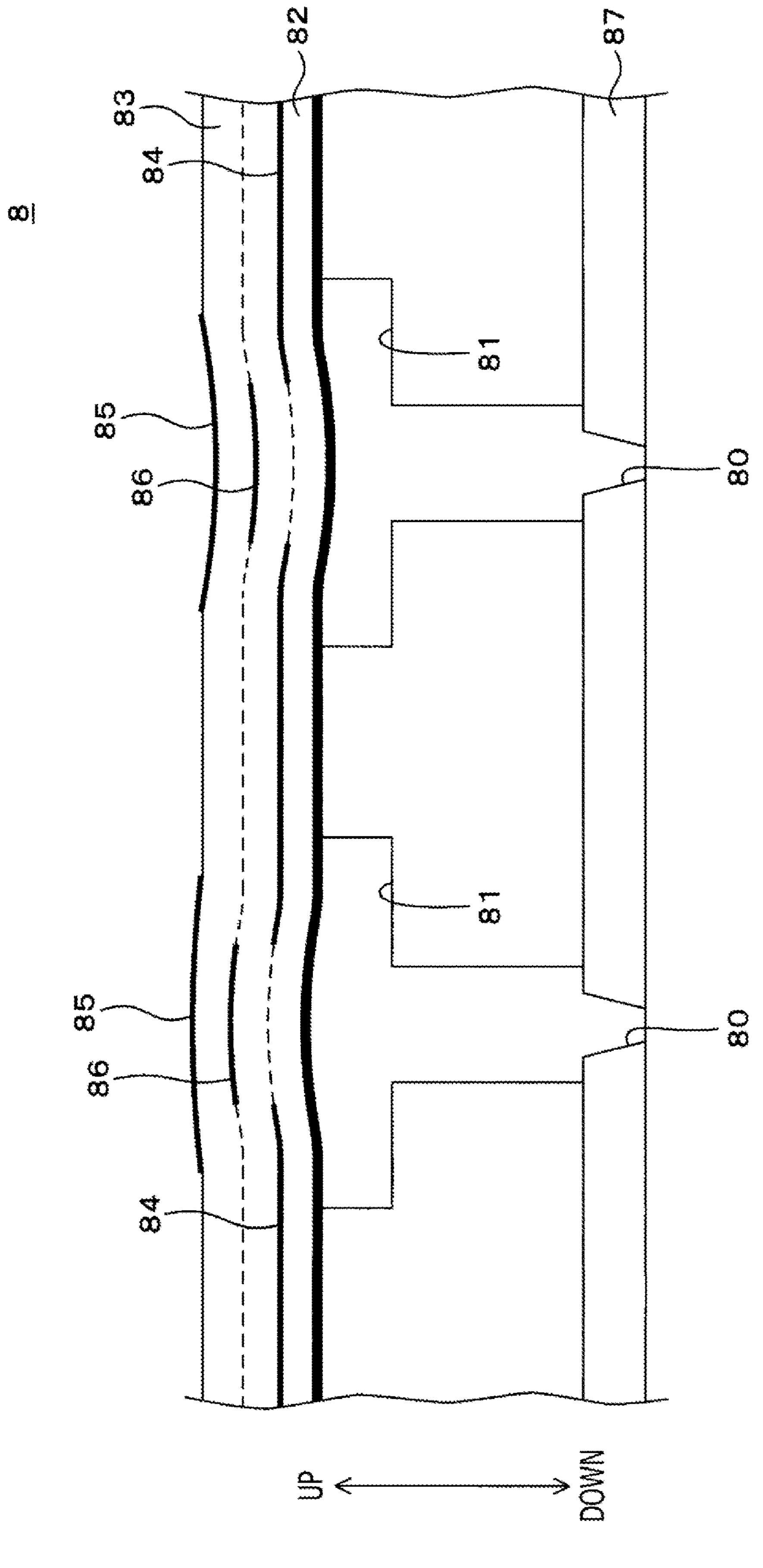
FIG. 2 is an enlarged cross-sectional view of a part of an inkjet head.

FIG. 2 schematically shows an enlarged cross-sectional view of a part of the inkjet head 8. The inkjet head 8 has multiple pressure chambers 81. The multiple pressure chambers 81 constitute multiple pressure chamber arrays. On an upper side with respect to the pressure chambers 81, a vibration plate 82 is formed. On an upper side with respect to the vibration plate 82 is formed. On the upper side with respect to the vibration plate 82, a layered piezoelectric body 83 is formed. Further, on the upper side with respect to each pressure chamber 81 and between the piezoelectric body 83 and the vibration plate 82, a first common electrode 84 is formed.

Inside the piezoelectric body 83, a second common electrode 86 is formed. The second common electrode 86 is arranged above the pressure chambers 81 and above the first common electrode 84. The second common electrode 86 is arranged at positions where the second common electrode 86 does not face the first common electrode 84. Above each pressure chamber 81, and on an upper surface of the piezoelectric body 83, individual electrodes 85 are formed. The individual electrodes 85 face the first common electrode 84 and the second common electrode 86 in an up-down direction with the piezoelectric body 83 being arranged therebetween. The vibration plate 82, the piezoelectric body 83, the first common electrode 84, the individual electrodes 85, and the second common electrode 86 constitute an actuator 88.

The individual electrodes 85, the first common electrode 84, and the piezoelectric bodies 83 constitute first condensers 89*a*. The individual electrodes 85, the second common electrode 86 and the piezoelectric body 83 constitute a second condenser 89*b*.

At a lower part of each pressure chamber 81, a nozzle plate 87 is provided. On the nozzle plate 87, multiple nozzles 80 which penetrate the nozzle plate 87 in the up-down direction are formed. The multiple nozzles 80 are arranged below the pressure chambers 81, respectively. The multiple nozzles 80 constitute multiple nozzle arrays arranged along the pressure chamber arrays.

Figure 3:
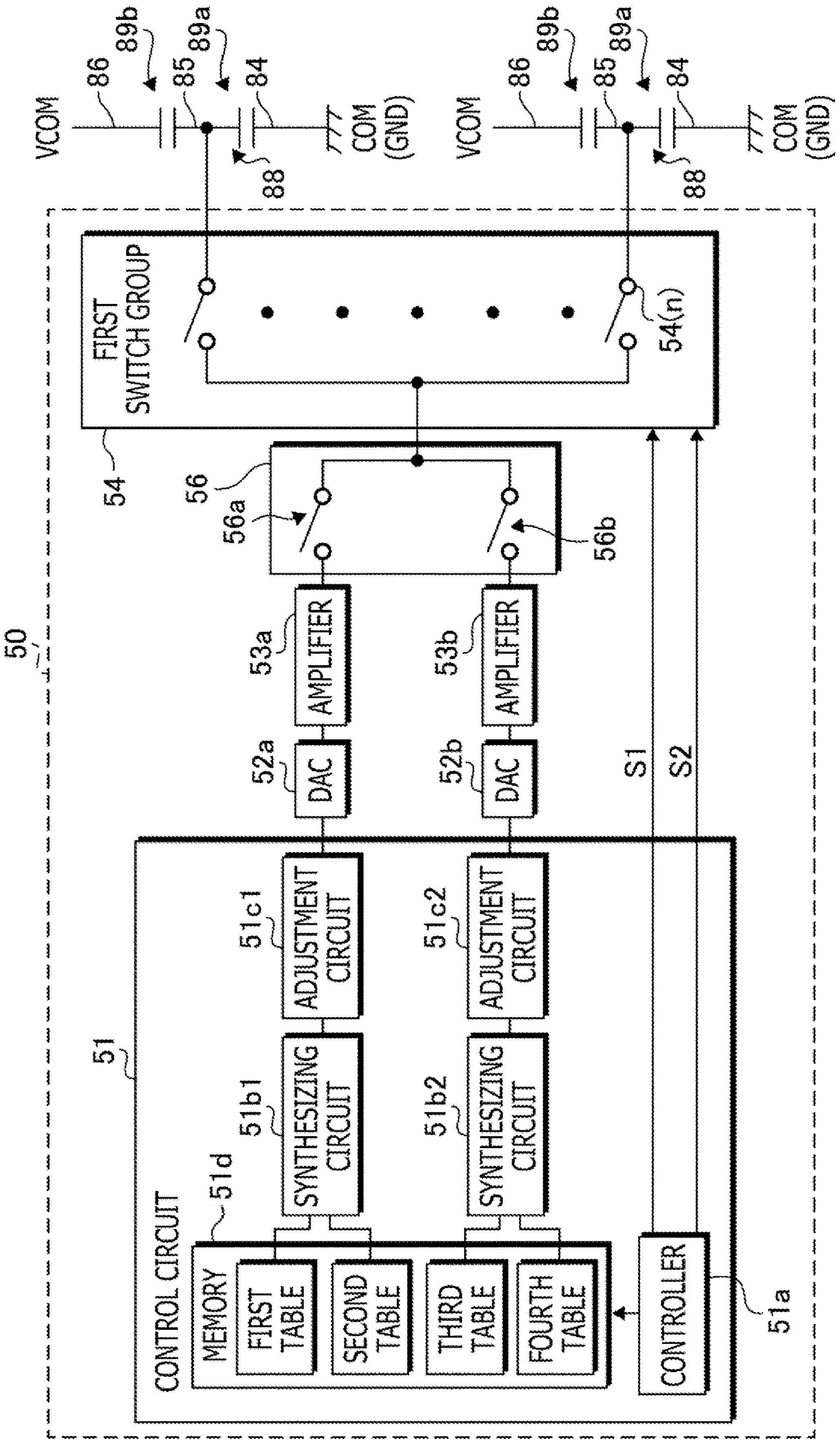
FIG. 3 is a block diagram of a control device.

As shown in FIG. 3, the first common electrode 84 is connected to a COM terminal, and the second common electrode 86 is connected to a VCOM terminal. The COM terminal is grounded in the present embodiment. A VCOM voltage is higher than a COM voltage. The individual electrodes 85 are connected to the first switch group 54 (see FIG. 3). When a High or Low voltage is applied to the individual electrodes 85, the piezoelectric body 83 is deformed and the vibration plate 82 vibrates. By the vibration of the vibration plate 82, ink is ejected from the pressure chamber 81 through the nozzle 80.

FIG. 3 is a block diagram of the control device 50, and FIGS. 4A-4D respectively illustrate examples of first to fourth tables. The control device 50 has a control circuit 51, two D/A converters (DACs) 52*a* and 52*b*, two amplifiers 53*a* and 53*b*, a first switch group 54, and a second switch group 56. The control circuit 51 has a controller 51*a*, two synthesizing circuits 51*b*1 and 51*b*2, two adjustment circuits 51*c*1 and 51*c*2, and a memory 51*d*. The controller 51*a* has a processor such as a CPU, an MPU, a GPU, or a logic circuit, for example, an FPGA. The control device 50 may include three or more DACs, three or more amplifiers, three or more synthesis circuits, and three or more adjustment circuits.

The memory 51*d* stores first through fourth tables. In the first through fourth tables, driving waveform data is stored. The driving waveform data is data representing voltage waveforms applied to the individual electrodes 85, i.e., driving waveforms that drive the actuators 88, and is quantized digital data. In the present embodiment, driving waveform data Da, Db, Dc, and Dd are stored in the first through fourth tables, respectively.

The synthesizing circuits 51*b*1 and 51*b*2 are configured to synthesize multiple driving waveform data. The adjustment circuits 51*c*1 and 51*c*2 are configured to receive data output from the synthesizing circuits 51*b*1 and 51*b*2, respectively. Each of the adjustment circuits 51*c*1 and 51*c*2 has a digital filter configured to oversample the received data, i.e., digital signal, a noise shaper (delta-sigma modulator) configured to output a digital signal with reduced bit count by applying delta-sigma modulation (differential integration processing)

to the multi-bit digital signal from the digital filter, and a wave shaping circuit configured to shape the waveform of the pulses that constitute the digital signal from the noise shaper.

DACs 52*a* and 52*b* are configured to convert digital signals to analog signals. Amplifiers 53*a* and 53*b* are configured to amplify the analog signals. The second switch group 56 has a first switch 56*a* and a second switch 56*b*.

The synthesizing circuit 51*b*1, the adjustment circuit 51*c*1, the DAC 52*a*, and the amplifier 53*a* are connected in series. The synthesizing circuit 51*b*2, the adjustment circuit 51*c*2, the DAC 52*b*, and the amplifier 53*b* are connected in series.

One end of the first switch 56*a* is connected to the amplifier 53*a*, and the other end of the first switch 56*a* is connected to the first switch group 54. One end of the second switch 56*b* is connected to the amplifier 53*b*, and the other end of the second switch 56*b* is connected to the first switch group 54.

The first switch group 54 has a plurality of n-th switches 54(*n*) (n=1, 2, . . . ). Each n-th switch 54(*n*) is configured, for example, by an analog switch IC. One end of each n-th switch 54(*n*) is connected to the other ends of the first switch 56*a* and the second switch 56*b* via a common bus. The other end of each n-th switch 54(*n*) is connected to each individual electrode corresponding to the plurality of nozzles 80. That is, one n-th switch 54(*n*) is provided for one actuator 88. The first switch group 54 corresponds to a separator.

FIGS. 5A-5D illustrate examples of driving waveforms A, B, C and D. The driving waveforms A, B and C are used to deform the piezoelectric body 83, causing the vibration of the vibration plate 82, which in turn causes the ink in the pressure chamber (pressure chamber) 81 to be ejected through the nozzle 80, after passing through the descender. In each of FIGS. 5A-5D, a right-hand side of the graph shows a more past state than a left-hand side. Also, in FIGS. 6A-6D, 7, 8A-8E, 9A-9C, 10A, and 10B, a right-hand side of the graph shows a more past state than a left-hand side. In FIGS. 5A-5D, Ga is the amplitude of the driving waveform A, Gb is the amplitude of the driving waveform B, Gc is the amplitude of the driving waveform C, and Gd is the amplitude of the driving waveform D.

Figure 4A:
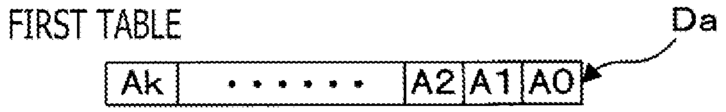
Figure 4B:
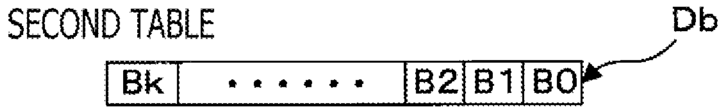
Figure 4C:
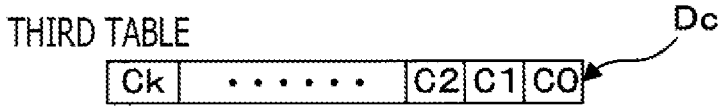
Figure 4D:
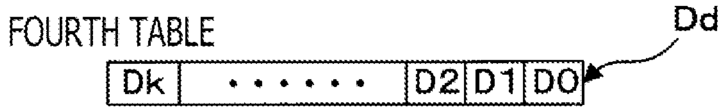
Figure 5A:
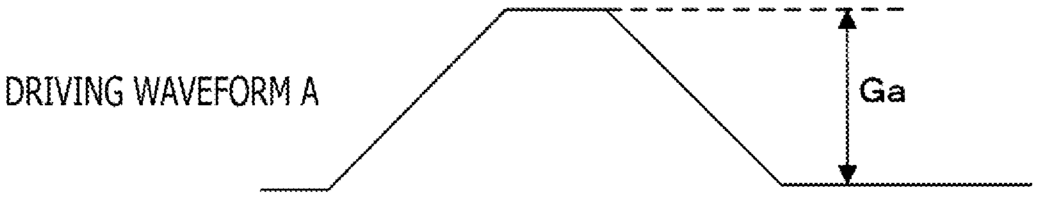
Figure 5B:
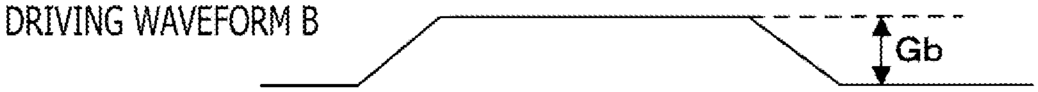
Figure 5C:
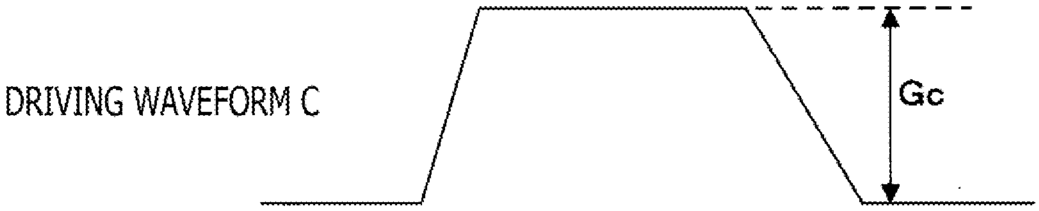
Figure 5D:
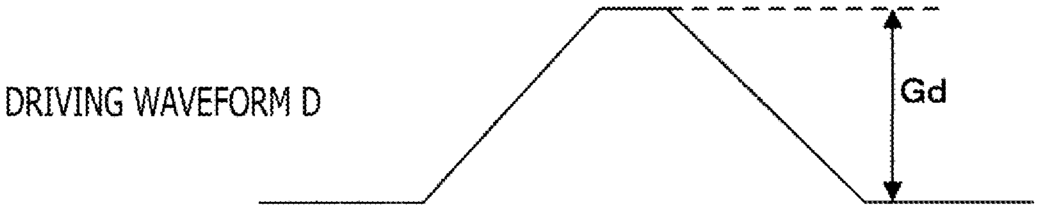

Driving waveform data Da shown in FIG. 4A is quantized data of a driving waveform A, driving waveform data Db shown in FIG. 4B is quantized data of a driving waveform B, driving waveform data Dc shown in FIG. 4C is quantized data of a driving waveform C, driving waveform data Dd shown in FIG. 4D is quantized data of a driving waveform D The driving waveform data Dd shown in FIG. 4*a* is the quantized data of driving waveform D. The driving waveform data Da has quantized data Ak (k=0, 1, 2, . . . ), the driving waveform data Db has quantized data Bk (k=0, 1, 2, . . . ), the driving waveform data Dc has quantized data Ck (k=0, 1, 2, . . . ) and the driving waveform data Dd has quantized data Dk (k=0, 1, 2, . . . ).

FIG. 6A illustrates an example of the first synthesized digital data, FIG. 6B illustrates an example of the first basic analog synchronization signal, FIG. 6C illustrates an example of the second synthesized digital data, and FIG. 6D illustrates an example of the second basic analog synchronization signal. FIG. 6A-6D shows that SA, SB, SC, and SD correspond to the driving waveforms A, B, C and D, which are analog signals converted from data Ak, Bk, Ck and Dk, respectively. When the actuator 88 is driven, the controller 51*a* accesses the memory 51*d* to output the driving waveform data Da and Db stored in the first and second tables to the synthesizing circuit 51*b*1. The driving waveform data Da and Db are for arranging the data Ak and Bk in order with a particular time interval, in the order of A0, B0, A1, B1, . . . , Ak, and Bk. The time series data is a digital signal.

The synthesizing circuit 51*b*1 is configured to arrange the quantized data Ak and Bk in the order of A0, B0, A1, B1, . . . , Ak, and Bk at time intervals corresponding to the inverse of the first sampling frequency, and synthesizes the driving waveform data Da and Db to produce the first synthesized digital data and output the first synthesized digital data to the adjustment circuit 51*c*1. It is noted that the synthesizing circuit 51*b*1 may synthesize three or more driving waveform data, that is, three or more digital data. The synthesizing circuit 51*b*1 may synthesize n (n is a natural number greater than or equal to 2) pieces of digital data.

A method of determining the driving waveform data to be synthesized in the synthesizing circuit 51*b*1 will be described below. When designing the control circuit 51, the similarity of multiple driving waveform data is calculated. The control circuit 51 is designed so that the synthesizing circuit 51*b*1 synthesizes multiple (i.e., n pieces of) driving waveform data of which the similarity is within a particular similarity range. The similarity is determined based on the differences in amplitudes among the multiple driving waveforms. The range of similarity is, for example, below a first threshold.

In the present embodiment, the difference between the amplitude Ga of the driving waveform A corresponding to the driving waveform data Da and the amplitude Gb of the driving waveform B corresponding to the driving waveform data Db is less than a first threshold value (see FIG. 5). The amplitudes Ga and Gb correspond to the amplitude of a driving waveform signal Pa and the amplitude of a driving waveform signal Pb, as described below.

In the first synthesized digital data, the quantized data Ak and the quantized data Bk are continuous. In other words, there is no other quantized data and no other waveform data between quantized data Ak and quantized data Bk. The adjustment circuit 51*c*1 performs a particular processing on the first synthesized digital data and outputs the processed first synthesized digital data to the DAC 52*a*. The DAC 52*a* performs analog conversion on the first synthesized digital data, generates the first basic analog synchronization signal, and outputs the first basic analog synchronization signal to the amplifier 53*a*. The synthesizing circuit 51*b*1, the adjustment circuit 51*c*1, and the DAC 52*a* correspond a first digital synthesizer. The first basic analog synthesized is a signal in which an analog signal SA that is an analog conversion of the data Ak, and an analog signal SB that is an analog conversion of the data Bk, are arranged in alternating sequence. The amplifier 53*a* is configured to amplify the first basic analog synchronization signal and outputs the amplified first basic analog synchronization signal to the first switch 56*a*.

When driving the actuator 88, the controller 51*a* accesses the memory 51*d* to output the driving waveform data Dc and Dd stored in the third and fourth tables to the synthesizing circuit 51*b*2. The driving waveform data Dc and Dd are for arranging the data Ck and Dk in order with a particular time interval, in the order C0, DO, C1, D1, . . . , Ck, and Dk. The time series data is a digital signal.

The synthesizing circuit (synthesizing circuit) 51*b*2 arranges the quantized data Ck and Dk in the order of C0, D0, C1, D1, . . . , Ck, Dk at intervals of time corresponding to the inverse of the first sampling frequency, synthesizes the driving waveform data Dc and Dd, generates the second synthesized digital data and output the second synthesized digital data to the adjustment circuit 51*c*2. The synthesizing circuit 51*b*2 may synthesize three or more driving waveform data, that is, three or more digital data. Synthesizing circuit 51*b*2 may synthesize m (m is a natural number greater than or equal to 2) pieces of digital data.

A method of determining the driving waveform data to be synthesized in the synthesizing circuit 51*b*2 is described. When designing the control circuit 51, the similarity of multiple driving waveform data is calculated. The control circuit 51 is designed so that the synthesizing circuit 51*b*2 synthesizes multiple (m pieces of) driving waveform data of which the similarity is within a particular similarity range. The similarity is determined based on the difference in amplitudes of the plurality of driving waveforms. The range of the similarity is, for example, less than or equal to the first threshold value.

In the present embodiment, the difference between the amplitude Gc of the driving waveform C corresponding to the driving waveform data Dc and the amplitude Gd of the driving waveform D corresponding to the driving waveform data Dd is less than or equal to the first threshold value (see FIG. 5). It is noted that the amplitudes Gc and Gd correspond to the amplitude of the driving waveform signal Pc and the amplitude of the driving waveform signal Pd described below.

In the second synthesized digital data, the quantized data C0 and the quantized data D0 are continuous. In other words, there is no other quantized data and no other waveform data between the quantized data Ck and the quantized data Dk. The adjustment circuit 51*c*2 performs a particular processing on the second synthesized digital data and outputs the processed second synthesized digital data to the DAC 52*b*. The DAC 52*b* performs analog conversion on the second synthesized digital data, generates the second basic analog synchronization signal, and outputs the second basic analog synchronization signal to the amplifier 53*b*. The synthesizing circuit 51*b*2, the adjustment circuit 51*c*2, and the DAC 52*b* correspond to a second digital synthesizer. The second basic analog synchronization signal is the analog signal SC, in which an analog signal SC that is an analog conversion of data Ck, and the analog signal SD, which is an analog conversion of data Dk, are arrange in alternating sequence. The amplifier 53*b* amplifies the second basic analog synchronization signal and outputs the amplified second basic analog synchronization signal to the second switch 56*b*.

FIG. 7 illustrates an example of a time-division multiplexed signal. The second switch group 56 alternately opens and closes the first switch 56*a* and the second switch 56*b* at intervals corresponding to the inverse of the second sampling frequency. The second sampling frequency is, for example, twice the first sampling frequency. For example, the second switch group 56 samples the analog signal SB constituting the first basic analog synchronization signal, the analog signal SC constituting the second basic analog synchronization signal, the analog signal SA constituting the first basic analog synchronization signal, and the analog signal SD constituting the second basic analog synchronization signal at the second sampling frequency, arranges the analog signals SB, SC, SA and SD in order to generates time-division multiplexed signals, and outputs the time-division multiplexed signals to the first switch group 54. The second switch group 56 corresponds to an integrated signal synthesizer (synthesizer), and the time-division multiplexed signal corresponds to an integrated analog signal according to aspects of the present disclosures. In the time-division multiplexed signal, the analog signal SB, the analog signal SC, the analog signal SA, and the analog signal SD are arranged in chronological order at each time interval Δt corresponding to the inverse of the second sampling frequency.

That is, n pieces of digital data are synthesized at the first frequency in the first digital synthesizer, and the first basic analog synthesis signal and the analog waveform signal (second basic analog synthesis signal) are synthesized at the second frequency which is higher than the first frequency in the integrated signal synthesizer to generate the integrated analog signals.

In a case where four pieces of driving waveform data are input to one synthesizing circuit, converted to analog signals by one DAC, and amplified by one amplifier, the frequency bandwidth required by the amplifier is twice as large as in a case where two amplifiers 53*a* and 53*b* are used. On the other hand, in the present embodiment, the frequency bandwidth required for the amplifiers 53*a* and 53*b* can be reduced.

In other words, the time-division multiplexed signal is not an analog signal corresponding only to the data Bk, an analog signal corresponding only to the data Ck, an analog signal corresponding only to the data Ak, or an analog signal corresponding only to the data Dk. Further, the time-division multiplexed signal is an analog signal that is configured in such a manner that, at least, an analog signal corresponding to four groups of data, i.e., one data Bk, one data Ck, one data Ak, and one data Dk, and an analog signal corresponding to one data Bk+1, one data Ck+1, one data Ak+1, and one data Dk+1, are arranged continuously in a time-series sequence. For example, there is only one time-division multiplexed signal in FIG. 7. In FIG. 7, the analog signal SB corresponding to the leftmost data B (hereinafter referred to as "data Bp") appears to be isolated. However, the above isolated state is the result of an analog signal corresponding to a group of four data, i.e., data Bp−1, data Cp−1, data Ap−1 and data Dp−1, with the data Dp −1 is 0, and an analog signal corresponding to a group of four data, i.e., data Bp, data Cp, data Ap, and data Dp, with data Cp, data Ap, and data Dp are 0, being arranged continuously in a time-series sequence. Thus, the analog signal shown in FIG. 7 can be treated as a single time-division multiplexed signal.

In a time-division multiplexed signal, when a portion corresponding to the data Bk−1 is referred to as the first portion, a portion corresponding to the data Bk as the second portion, a portion corresponding to the data Ck−1 as the third portion, and a portion corresponding to the data Ck as the fourth portion, the third portion is arranged between the first portion and the second portion, and the second portion is arranged between the third portion and the fourth portion. In other words, the first and third portions are arranged continuously, and the second and fourth portions are arranged continuously. That is, in the time-division multiplexed signal, there is no second part, fourth part, or other waveforms between the first and third parts. Further, in the time-division multiplexed signal, there is no first part, third part, or other waveforms between the second and fourth parts. The same relationship exists between the data Ck and Ak, between the data Ak and Dk, and between the data Dk and Bk.

One time-division multiplexed signal is within one ejection drive period. For example, when the ejection drive frequency (spraying frequency) is 100 kHz, one ejection drive period (spraying period) is 10 μs, and a length of one time-division multiplexed signal is less than 10 μs. It is preferable that each of the data Bk, the data Ck, the data Ak and the data Dk includes three or more pieces of data in a single time-division multiplexed signal. The reason will be discussed below.

The controller 51*a* is configured to output a switch control signal S1 to control the opening and closing of the multiple n-th switches 54(*n*), a synchronization signal S2b corresponding to the driving waveform B, a synchronization signal S2c corresponding to the driving waveform C, a synchronization signal S2a corresponding to the driving waveform A, and a synchronization signal S2a corresponding to the driving waveform D, to the first switch group 54. It is noted that the four synchronization signals S2b, S2c, S2a and S2d are also referred to simply as synchronization signal S2 (see FIG. 3). The switch control signal S1 includes first selection information indicating selection of one of the multiple n-th switches 54(*n*) and second selection information indicating selection of one of the four synchronization signals S2b, S2c, S2a and S2d. The first selection information and the second selection information are associated with each other.

A synchronization signal generation circuit that generates the four synchronization signals S2b, S2c, S2a and S2d may be provided in the control device 50, and the four synchronization signals S2b, S2c, S2a and S2d may be output from the synchronization signal generation circuit to the first switch group 54 when a trigger signal is received from the controller 51*a*. Alternatively, the first switch group 54 may generate the synchronization signals S2b, S2c, S2a and S2d. Further, the first switch group 54 may be configured to generate the synchronization signals S2b, S2c, S2a and S2d when the trigger signal is received from the controller 51*a*.

FIGS. 8A-8D illustrate the relationship between the time-division multiplex signals and the synchronization signals S2b, S2c, S2a and S2d. Synchronization signals S2b, S2c, S2a and S2d are pulse waves. A time interval Δt is provided between a rising edge of the pulse of the synchronization signal S2b and a rising edge of the pulse of the synchronization signal S2c. Further, a time interval Δt is provided between a rising edge of the pulse of the synchronization signal S2c and a rising edge of the pulse of the synchronization signal S2a, a time interval Δt is provided between a rising edge of the pulse of the synchronization signal S2a and a rising edge of the pulse of the synchronization signal S2d, a time interval Δt is provided between a rising edge of the pulse of the synchronization signal S2d and a rising edge of the pulse of the synchronization signal S2b.

As mentioned above, in a time-division multiplexed signal, the analog signals SB, SC, SA, and SD are arranged in a time-series sequence at each time interval Δt corresponding to the inverse of the second sampling frequency. Therefore, when accessing the time-division multiplex signal at the rising edge of the pulse of the synchronization signal S2b, a driving waveform signal Pb, which corresponds to data Bk and indicates driving waveform B, can be obtained. When accessing the time-division multiplex signal at the rising edge of the pulse of the synchronization signal S2c, the driving waveform signal Pc, which corresponds to the data Ck and indicates the driving waveform C, can be obtained. When accessing the time-division multiplex signal at the rising edge of the pulse of synchronous signal S2a, the driving waveform signal Pa, which corresponds to data Ak and indicates driving waveform A, can be obtained. When accessing the time-division multiplex signal at the rising edge of the pulse of synchronous signal S2d, the driving waveform signal Pd, which corresponds to data Dk and indicates driving waveform D, can be obtained. In other words, one n-th switch 54(*n*) is input with one type of time-division multiplex signal and separates one of the driving waveform signals Pb indicating driving waveform B, the driving waveform signal Pc indicating driving waveform C, the driving waveform signal Pa indicating driving waveform A, or the driving waveform signal Pd indicating driving waveform D.

The first switch group 54 causes the selected n-th switch 54(*n*) to open and close at the open/close timing indicated by the selected synchronization signals S2a to S2d. In other words, the first switch group 54 causes the n-th switch 54(*n*) to open and close according to the particular sampling frequency.

FIGS. 9A-9D schematically illustrate the driving waveforms input to the actuator 88 as the n-th switch 54(*n*) is opened and closed. When the synchronization signal S2b is selected, the first switch group 54 closes the n-th switch 54(*n*) when the pulse of the synchronization signal S2b is in a high level section, while opening the n-th switch 54(*n*) when the pulse of the synchronization signal S2b is in a low level section. By the first and second condensers 89*a* and 89*b*, the charge applied to the individual electrodes 85 when the n-th switch 54(*n*) is closed is retained, and the driving waveform B1 is input to the actuator 88, as shown in FIG. 7. In other words, the driving waveform signal Pb is separated from the time-division multiplex signal using a particular sampling frequency, and the actuator 88 is driven by the driving waveform signal Pb. It is noted that three or more data Bk are required to represent the unevenness of the driving waveform signal Pb.

When the synchronization signal S2c is selected, the first switch group 54 closes the n-th switch 54(*n*) when the pulse of the synchronization signal S2c is in a high level section, and opens the n-th switch 54(*n*) when the pulse of the synchronization signal S2c is in a low level section. By the first and second condensers 89*a* and 89*b*, the charge applied to the individual electrodes 85 when the n-th switch 54(*n*) is closed is retained, and the driving waveform C1 is input to the actuator 88, as shown in FIG. 7. In other words, the driving waveform signal Pc is separated from the time-division multiplexed signal using a particular sampling frequency, and the actuator 88 is driven by the driving waveform signal Pc. It is noted that three or more data Ck are required to represent the unevenness of the driving waveform signal Pc.

When the synchronization signal S2a is selected, the first switch group 54 closes the n-th switch 54(*n*) when the pulse of the synchronization signal S2a is in the high level section, and opens the n-th switch 54(*n*) when the pulse of the synchronization signal S2a is in the low level section. By the first and second condensers 89*a* and 89*b*, the charge applied to the individual electrodes 85 when the n-th switch 54(*n*) is closed is retained, and the driving waveform A1 is input to the actuator 88, as shown in FIG. 7. In other words, the driving waveform signal Pa is separated from the time-division multiplexed signal using a particular sampling frequency, and the actuator 88 is driven by the driving waveform signal Pa. It is noted that three or more data Ak are required to represent the unevenness of the driving waveform signal Pa.

When the synchronization signal S2d is selected, the first switch group 54 closes the n-th switch 54(*n*) when the pulse of the synchronization signal S2d is in the high level section, and opens the n-th switch 54(*n*) when the pulse of the synchronization signal S2d is in the low level section. By the first and second condensers 89*a* and 89*b*, the charge applied to the individual electrodes 85 when the n-th switch 54(*n*) is closed is retained, and the driving waveform A1 is input to the actuator 88, as shown in FIG. 7. In other words, the driving waveform signal Pd is separated from the time-division multiplexed signal using a particular sampling frequency, and the actuator 88 is driven by the driving waveform signal Pd. It is noted that three or more data Dk are required to represent the unevenness of the driving waveform signal Pd.

The particular sampling frequency is equal to or greater than the resonance frequency of the inkjet head 8. The resonant frequency of the inkjet head 8 is either the resonant frequency when the pressure chamber 81 is not filled with ink (liquid) or the resonant frequency when the pressure chamber 81 is filled with ink. If, for example, the resonance frequency of the inkjet head 8 when the pressure chamber 81 is not filled with ink is 100 kHz, then the resonance frequency of the inkjet head 8 when the pressure chamber 81 is filled with ink is less than 100 kHz. Concretely, the resonant frequency of the inkjet head 8 when pressure chamber 81 is filled with ink is 90 kHz. In other words, the resonance frequency of the inkjet head 8 when the pressure chamber 81 is not filled with ink is higher than that of the inkjet head 8 when the pressure chamber 81 is filled with ink.

In the printing apparatus 1 according to the present embodiment, n pieces of digital data are synthesized and converted to an analog signal to generate one first basic analog synchronization signal. Further, m pieces of digital data are synthesized and converted to an analog signal to generate one second basic analog synchronization signal. The first basic analog synchronization signal and the second basic analog synchronization signal are synthesized to generate a time-division multiplexed signal, i.e., an integrated analog signal. From the integrated analog signal, the driving waveform signal indicated by any one of the n pieces of digital data or the driving waveform signal indicated by any one of the m pieces of digital data is separated. Therefore, one period for printing one pixel includes only a period of one of the separated driving waveform signals, and does not include a period of a driving waveform signal that has not been separated. Accordingly, standby time for the nozzle can be reduced.

FIGS. 10A-10B illustrate the similarity of driving waveforms A and B and driving waveforms C and D according to a modification. The similarity of driving waveforms A and B and the similarity of driving waveforms C and D may be determined as follows. For example, as shown in FIG. 10A, the driving waveform A and the driving waveform B are superimposed so that points where the amplitude gradually decreases from positive to zero over time (i.e., the left-hand side end of the amplitude protrusion in FIG. 10A) match. The hatched area in FIG. 10A is an area where the protrusion of driving waveform A overlaps with the protrusion of driving waveform B.

Assume that an area of hatched portion is SO, an area of protruding portion of driving waveform A is S1, and an area of protruding portion of driving waveform B is S2. Then, SO·2/(S1+S2) represents a value indicating a shape similarity between the driving waveform A and the driving waveform B. It is noted that SO·2/(S1+S2) is greater than or equal to a particular second threshold having been determined in advance. That is, when n (n being a natural number greater than or equal to 2) driving waveform signals are synthesized, the value indicating the shape similarity among n driving waveforms is SO·n/(S1+S2+ . . . +Sn), where SO·n/(S1+S2+ . . . +Sn) is greater than or equal to the second threshold.

For example, as shown in FIG. 10B, the driving waveform C and the driving waveform D are superimposed so that the points where the amplitude gradually decreases from positive to zero over time (i.e., the left-hand side end of the amplitude protrusion in FIG. 10B) coincide. The hatched area in FIG. 10B is the area where the protrusion of the driving waveform C overlaps the protrusion of the driving waveform D.

Assume that an area of the hatched portion is SO, an area of the protruding portion of the driving waveform C is S1, and an area of the protruding portion of the driving waveform D is S2. Then, SO·2/(S1+S2) represents a value indicating a shape similarity between the driving waveform C and the driving waveform D. It is noted that SO·2/(S1+S2) is greater than or equal to the particular second threshold. That is, when m (m being a natural number greater than or equal to 2) driving waveform signals are synthesized, the value indicating the shape similarity among n driving waveforms is SO·m/(S1+S2+ . . . +Sm), where SO·m/(S1+S2+ . . . +Sm) is greater than or equal to the second threshold.

In other words, the control circuit 51 is designed in such a manner that multiple driving waveform signals are synthesized for which the value indicating shape similarity is greater than or equal to the second threshold.

A printing apparatus according to a second embodiment will be described with reference to the accompanying drawings. Among components of the printing apparatus according to the second embodiment, the same symbols are assigned to the components similar to those of the first embodiment, and the detailed description will be omitted. FIG. 11 is a block diagram of the control device 50. The control device 50 has three DACs 52*a*, 52*c* 52*d* and three amplifiers 53*a*, 53*c* and 53*d*. The control circuit 51 has one synthesizing circuit 51*b*1 and three adjustment circuits 51*c*1, 51*c*3 and 51*c*4. The second switch group 56 has a first switch 56*a*, a third switch 56*c*, and a fourth switch 56*d*.

Adjustment circuit 51*c*3, DAC 52*c*, and the amplifier 53*c* are connected in series. One end of the third switch 56*c* is connected to the amplifier 53*c*, and the other end of the third switch 56*c* is connected to the first switch group 54. The memory 51*d*, the adjustment circuit 51*c*3, and the DAC 52*c* correspond to a generator according to aspects of the present disclosures.

The adjustment circuit 51*c*4, the DAC 52*d*, and the amplifier 53*d* are connected in series. One end of the fourth switch 56*d* is connected to the amplifier 53*d*, and the other end of the fourth switch 56*d* is connected to the first switch group 54. The memory 51*d*, the adjustment circuit 51*c*4, and the DAC 52*d* correspond to the generator according to aspects of the present disclosures.

The controller 51*a* outputs the data Ck stored in the third table to the adjustment circuit 51*c*3. The adjustment circuit 51*c*3 performs a particular processing on the data Ck and outputs the processed data Ck to the DAC 52*c*. The DAC 52*c* performs analog conversion on the data Ck and outputs the analog signal of the data Ck to the amplifier 53*c*. The amplifier 53*c* amplifies the analog signal of the data Ck and outputs the amplified analog signal to the third switch 56*c*.

The controller 51*a* outputs the data Dk stored in the fourth table to the adjustment circuit 51*c*4. The adjustment circuit 51*c*4 performs a particular processing on the data Dk and outputs the processed data Dk to the DAC 52*d*. The DAC 52*d* performs analog conversion on the data Dk and outputs the analog data of the data Dk to the amplifier 53*d*. The amplifier 53*d* amplifies the analog signal of the data Dk and outputs the amplified analog signal to the fourth switch 56*d*.

The second switch group 56 opens and closes the first switch 56*a* twice, then opens and closes the third switch 56*c* once, then opens and closes the fourth switch 56*d* once, and repeats these open/close operations to generate time-division multiplex signals, for example, at intervals corresponding to the inverse of the second sampling frequency, the time-division multiplex signals generated as above being output to the first switch group 54.

The data Ck and the data Dk (digital data) are not synthesized by the synthesis circuit. The data Ck and the data Dk are analog converted without being synthesized, and then synthesized at the second switch group 56. Since the synthesis of digital signals by the synthesizing circuit is not performed, the reproducibility of the driving waveforms C and D based on the driving waveform signals Pc and Pd separated from the time-division multiplexed signals is higher than in the case where the synthesis of digital signals by the synthesizing circuit is performed. That is, the driving waveforms C1 and D1 (see FIG. 9) are more similar to the driving waveforms C and D (see FIG. 5). When the driving waveform data Dc and Dd for high-precision printing are stored in the third and fourth tables, the above configuration increases the reproducibility of driving waveforms C and D and realizes high-precision printing.

A printing apparatus according to a third embodiment will be described with reference to the accompanying drawings. Among components of the printing apparatus according to the third embodiment, the same symbols are assigned to the components similar to those of the first embodiment, and the detailed description will be omitted. FIG. 12 is a block diagram of the control device 50. In the third embodiment, the configuration is similar to that of the first embodiment, except that the driving waveform data Db stored in the second table is output to the synthesizing circuit **51*b*2 instead of to the synthesizing circuit 51*b*1. It is noted that multiple pieces of digital data are typically input to the synthesizing circuit 51*b*1, but a single piece of digital data may be input as well. When a single piece of digital data is input, the synthesizing circuit (51*b*1) outputs the single piece of digital data to the adjustment circuit (51*c*1**) without performing a synthesizing process. That is, a single piece of digital data may be input to the first digital synthesizer, and similarly, a single piece of digital data may be input to the second digital synthesizer.

For example, when the usage frequency of the driving waveform data Da stored in the first table is greater or equal to the particular third threshold value and the usage frequency of the driving waveform data Db stored in the second table is less than the third threshold value, the driving waveform data Da is output to the synthesizing circuit **51*b*2 instead of the synthesizing circuit 51*b*1, as shown in FIG. 12**, in order to prioritize the processing of the driving waveform data Da. That is, the number of pieces of digital data synthesized in the first digital synthesizer is reduced when the digital data includes digital data of which the usage frequency is equal to or greater than the particular third threshold is included, compared to the case where the digital data does not include digital data of which the usage frequency is equal to or greater than the particular third threshold. The usage frequency of each driving waveform data can be obtained in advance from past data, and the third threshold value can be set based on the obtained usage frequency.

For example, when the driving waveform data Db stored in the second table is not for high-precision printing and the driving waveform data Da stored in the first table is for high-precision printing, as shown in FIG. 12, the driving waveform (driving waveform) data Db is not used for high-precision printing. When the driving waveform data Da stored in the first table is the driving waveform data for high-precision printing, the synthesizing circuit **51*b* is used for the driving waveform data Db, as shown in FIG. 12, in order to prioritize the processing 51*b*2 instead of the synthesizing circuit 51*b*1. The driving waveform data Db is, for example, data used to form maintenance waveforms and is not used for printing. The driving waveform data Da is data used for printing, for example, to form an ejection waveform for ejecting ink onto a printing sheet 200**. The driving waveform data Da corresponds to high-precision digital data for high-precision printing. In other words, when the digital data synthesized in the first digital synthesizer includes high precision digital data, the number of digital data synthesized in the first digital synthesizer is reduced compared to the case where the digital data does not include high precision digital data. Alternatively, when the digital data synthesized in the first digital synthesizer includes high-precision digital data, the driving waveform data Db (digital data other than high-precision digital data) is not synthesized in the first digital synthesizer.

For example, when the frequency bandwidth of the amplifier **53*b* is wider than the particular frequency bandwidth and the frequency bandwidth of the amplifier 53*a* is equal to or narrower than the particular frequency bandwidth, the driving waveform data Db is output to the synthesizing circuit 51*b*2 instead of the synthesizing circuit 51*b*1, as shown in FIG. 12, in order to reduce the load acting on the amplifier 53*a***. In other words, the number of pieces of digital data synthesized in the first digital synthesizer is reduced. The number of pieces of digital data synthesized in the first digital synthesizer is determined according to the load acting on the amplifier.

The fact that the frequency bandwidth of the amplifier **53*b* is wider than the particular frequency bandwidth means that, for example, when the particular frequency bandwidth is from W1 [Hz] to W2 [Hz] ($W1<W2$), the frequency bandwidth of the amplifier 53*b* is from W3 [Hz] to W4 [Hz] ($W3<W4$, $W3<W1$, $W4>W2$). The fact that the frequency bandwidth of the amplifier 53*a* is equal to or narrower than the predetermined frequency bandwidth means that the frequency bandwidth of the amplifier 53*a*** is from W5 [Hz] to W6 [Hz] ($W5<W6$, $W5>W1$, $W6<W2$).

For example, as shown in FIG. 6B, when the amplitude of the difference R between the amplitude of the data Ak constituting the driving waveform data Da and the amplitude of the data Bk constituting the driving waveform data Db, which is adjacent to the data Ak over time, is greater than or equal to a particular value, the driving waveform data Db is not synthesized in the synthesizing circuit **51*b*1 but in the synthesizing circuit 51*b*2 in order to reduce the load acting on the amplifier 53*a***. The driving waveform data Da corresponds to first digital data, the driving waveform data Db corresponds to second digital data, data Ak corresponds to a first data element, and data Bk adjacent to data Ak over time corresponds to a second data element. When the amplitude of the difference R is greater than or equal to the particular value, the number of pieces of digital data synthesized in the first digital synthesizer is reduced compared to the case where the amplitude of the difference R is less than the particular value. The comparison of the difference R to a particular value may be made by comparing the largest difference R to the particular value, or by comparing the average of each difference R to the particular value.

In the third embodiment, the number of pieces of driving waveform data input to the synthesizing circuit **51*b*1 is only one, but multiple pieces of driving waveform data may be input to the synthesizing circuit 51*b*1. For example, a fifth table containing the driving waveform data De may be stored in the memory 51***d*, and the driving waveform data Da and De may be input to the synthesizing circuit 51*b*1. That is, the number of pieces of driving waveform data input to the synthesizing circuit 51*b*1 may be reduced from three or more to two or less.

A printing apparatus according to a fourth embodiment will be described with reference to the accompanying drawings. Among components of the printing apparatus according to the fourth embodiment, the same symbols are assigned to the components similar to those of the second embodiment, and the detailed description will be omitted. FIG. 13 is a block diagram of the control device 50.

The control circuit 51 includes a synthesizing circuit 51*b*3. The synthesizing circuit 51*b*3 is a redundant circuit that is not normally used and is used when modifications are necessary. The synthesizing circuit 51*b*3 is connected to the adjustment circuit 51*c*3. The amplifier 53*c* has a higher bandwidth than the amplifier 53*a*.

Unlike the second embodiment (see FIG. 11), the driving waveform data Da stored in the first table and the driving waveform data Db stored in the second table are input to the synthesizing circuit 51*b*3 and then output to the adjustment circuit 51*c*3, the DAC 52*c*, and the amplifier 53*c*, in that order. Further, the driving waveform data Dc stored in the third table is input to the synthesizing circuit 51*b*1.

Assume that the driving waveform data Da stored in the first table and the driving waveform data Db stored in the second table are initially designed to be input to the synthesizing circuit 51*b*1, as shown in FIG. 11. However, as shown in FIG. 6B, for example, if the magnitude of the difference R between the amplitude of the data Ak constituting the driving waveform data Da and the amplitude of the data Bk constituting the driving waveform data Db, which is adjacent to said data Ak over time, is greater than or equal to a particular value, it is preferable to amplify the data with amplifier 53*c*, which has a higher frequency bandwidth than that of amplifier 53*a*. It is because the amplifier 53*c* is capable of amplifying the amplitude of the input signal to the target amplitude in a shorter time than the amplifier 53*a*, and maintaining the target amplitude. Therefore, as shown in FIG. 13, the design is changed so that the driving waveform data Da stored in the first table and the driving waveform data Db stored in the second table are input to the synthesizing circuit 51*b*3. The synthesizing circuit 51*b*13, the adjustment circuit 51*c*3, and the DAC 52*c* after the design change correspond to a first digital synthesizer according to aspects of the present disclosures.

In the fourth embodiment, the driving waveform data Dc stored in the third table is input to the synthesizing circuit 51*b*1 to prevent the load acting on the amplifier 53*c* from becoming excessive. However, the driving waveform data Dc stored in the third table may be input to the synthesizing circuit 51*b*3. Further, the driving waveform data Dd stored in the fourth table may be input to the synthesizing circuit 51*b*1 or 51*b*3.

For example, when at least one of the usage frequency of the driving waveform data Da stored in the first table and the usage frequency of the driving waveform data Db stored in the second table is higher than the particular fourth threshold value, it is preferable to have the driving waveform data Da and Db amplified by the amplifier 53*c* that has a higher frequency bandwidth than the amplifier 53*a*. The amplifier 53*c* can amplify the amplitude of the input signal to the target amplitude in a shorter time than the amplifier 53*a* and maintain the target amplitude, and can accurately reproduce driving waveforms based on driving waveform data that are frequently used. Therefore, as shown in FIG. 13, the design is changed so that the driving waveform data Da stored in the first table and the driving waveform data Db stored in the second table are input to the synthesizing circuit 51*b*3. It is noted that the usage frequency of each driving waveform data can be obtained in advance from past data, and the fourth threshold value can be set based on the obtained usage frequency. That is, when the digital data synthesized in the first digital synthesizer includes digital data of which the usage frequency is higher than or equal to the fourth threshold, an amplifier with a higher frequency bandwidth is used to amplify the first basic analog synchronization signal compared to a case where the usage frequency does not include digital data of which the usage frequency is higher than or equal to the fourth threshold.

For example, when at least one of the driving waveform data Da stored in the first table and the driving waveform data Db stored in the second table is driving waveform data is the driving waveform data for high-precision printing, it is preferable to amplify the driving waveform data Da and Db by amplifier 53*c*, which has a higher frequency bandwidth than that of amplifier 53*a*. It is because the amplifier 53*c* can amplify the amplitude of the input signal to the target amplitude in a shorter time than the amplifier 53*a* and maintain the target amplitude, and can accurately reproduce the driving waveform according to the driving waveform data for high-precision printing. The driving waveform data for high-precision printing is data used for printing, for example, to form the ejection waveform for ejecting ink onto the printing sheet 200. That is, when the digital data synthesized in the first digital synthesizer includes high-precision digital data for high-precision printing, an amplifier with a higher frequency bandwidth is used to amplify the first basic analog synthesis signal compared to a case where it does not include high-precision digital data.

A printing apparatus 1 according to a fifth embodiment will be described with reference to the accompanying drawings. Among components of the printing apparatus 1 according to the fifth embodiment, the same symbols are assigned to the components similar to those of the first embodiment, and the detailed description will be omitted.

FIG. 14A shows an example of the first synthesized digital data, FIG. 14B shows an example of a first basic analog synchronization signal, FIG. 14C shows an example of the second synthesized digital data, and FIG. 14D shows an example of a second basic analog synchronization signal. The synthesizing circuit 51*b*1 samples the quantized data Ak and Bk based on the third sampling frequency and arranges the sampled data in the order of A0, B0, A1, B1, . . . , Ak, and Bk to produce the driving waveform data Da and Db, to generate the first synthesized digital data, and outputs the data to the adjustment circuit 51*c*1. When, for example, the third sampling frequency is Y [Hz], synthesizing circuit 51*b*1 samples data Ak between 0 and 1/Y [s], samples data Bk between 1/Y and 2/Y [s], and does not sample between 2/Y and 4/Y [s].

The adjustment circuit 51*c*1 performs particular processing on the first synthesized digital data and outputs the processed data to the DAC 52*a*. The DAC 52*a* performs analog conversion on the first synthesized digital data, generates the first basic analog synchronization signal, and outputs the analog data of the first synthesized digital data to the amplifier 53*a*. The synthesizing circuit 51*b*1, the adjustment circuit 51*c*1, and the DAC 52*a* correspond to the first digital synthesizer according to aspects of the present disclosures. The first basic analog synchronization signal is a signal in which the analog signal SA, which is an analog conversion of data Ak, and the analog signal SB, which is an analog conversion of data Bk, are arranged in an alternating sequence. The amplifier 53*a* amplifies the first basic analog synchronization signal and outputs the amplified first basic analog synchronization signal to the first switch 56*a*.

The synthesizing circuit 51*b*2 samples the quantized data Ck and Dk based on the third sampling frequency and arranges the sampled data in the order of C0, D0, C1, D1, . . . , Ck, and Dk, to generate the driving waveform data Dc and Dd, and outputs the same to the adjusting circuit 51*c*2. When, for example, the third sampling frequency is Y [Hz], the synthesizing circuit 51*b*2 does not sample from 0 to 2/Y [s], samples data Ck from 2/Y to 3/Y [s], and samples data Dk from 3/Y to 4/Y [s].

FIG. 15 illustrates an example of a time-division multiplexed signal. The second switch group 56 alternately opens and closes the first switch 56*a* and the second switch 56*b* at intervals corresponding to the inverse of the fourth sampling frequency. The fourth sampling frequency is, for example, ½ times the third sampling frequency. For example, the second switch group 56 samples the pairs of analog signals SA and SB, which constitute the first basic analog synchronization signal, and the pairs of analog signals SC and SD, which constitute the second basic analog synchronization signal, at the fourth sampling frequency, and arranges the sampled data in order to generate time-division multiplex signals and output the same to the first switch group 54. When, for example, the fourth sampling frequency is Y/2 [Hz], the synthesizing circuit 51*b*2 samples a pair of analog signals SA and SB from 0 to 2/Y [s], and samples a pair of analog signals SC and SD from 2/Y to 4/Y [s]. The time-division multiplexed signal corresponds to the integrated analog signal. In the time-division multiplexed signal, the pairs of the analog signals SA and SB and the pairs of the analog signals SC and SD are arranged in chronological order at time intervals corresponding to the inverse of the fourth sampling frequency.

That is, n pieces of digital data are synthesized at the third frequency in the first digital synthesizer, and the first basic analog synthesis signal and an analog waveform signal (second basic analog synthesis signal) are synthesized at the fourth frequency lower than the first frequency in the integrated signal synthesizer to generate the integrated analog signals.

In the case of a configuration different from that of the fifth embodiment, i.e., four pieces of driving waveform data are input to one synthesizing circuit, synthesized at the third frequency, converted into an analog signal by one DAC, amplified by one amplifier, and synthesized by the second switch group, then the operating frequency of the second switch group is the third frequency, which is twice as high as that of the fifth embodiment. On the other hand, in the fifth embodiment, the operating frequency of the second switch group 56 can be reduced.

The embodiments and modifications disclosed here should be considered in all respects illustrative and not restrictive. Aspects of the present disclosures are intended to include all modifications within the scope of the claims and equivalents. The matters described in each embodiment and each modification can be combined with each other. Further, the independent and dependent claims may be combined with each other in all combinations, regardless of the form of citation.

What is claimed is:

1. A printing apparatus comprising:

a first digital synthesizer configured to generate a first basic analog synthesis signal by synthesizing n pieces of digital data and converting the synthesized n pieces of digital data to an analog signal, each of the n pieces of digital data indicating a driving waveform used to drive an energy generating element to cause a nozzle to eject liquid, the n being a natural number greater than or equal to 2;

an integrated signal synthesizer configured to generate an integrated analog signal by synthesizing the first basic analog synthesis signal and one or more analog waveform signals indicating one or more driving waveforms, respectively; and a separator configured to separate one of a driving waveform signal indicated by one of the n pieces of digital data and driving waveform signals indicated by the one or more analog waveform signals from the integrated analog signal generated by the integrated signal synthesizer.

2. The printing apparatus according to claim 1, further comprising:

a second digital synthesizer configured to generate a second basic analog synthesis signal by synthesizing m pieces of digital data and converting the synthesized m pieces of digital data to an analog signal, each of the m pieces of digital data indicating a driving waveform used to drive the energy generating element, the m being a natural number greater than or equal to 2, wherein the one or more analog waveform signals include the second basic analog synthesis signal generated by the second digital synthesizer.

3. The printing apparatus according to claim 1, further comprising:

s pieces of generators configured to generate s pieces of analog signals, by executing digital to analog conversion of s pieces of digital data, each of the s pieces of digital data indicating a driving waveform used to drive the energy generating element, the s being a natural number, wherein the one or more analog waveform signals include the s pieces of analog signals generated by the s pieces of generators.

4. The printing apparatus according to claim 1, wherein the integrated analog signal constitutes a time-division multiplex signal transmittable through a single signal line.

5. The printing apparatus according to claim 1, wherein similarity of n pieces of driving waveform signals corresponding to the n pieces of digital data is within a particular similarity range.

6. The printing apparatus according to claim 5, wherein the similarity is determined based on difference in amplitudes of the n pieces of driving waveform signals, and wherein the difference in amplitudes of the n pieces of driving waveform signals is less than or equal to a first threshold value.

7. The printing apparatus according to claim 5, wherein the similarity is determined based on a shape similarity between the n pieces of driving waveform signals, and wherein a value indicating the shape similarity between the n pieces of driving waveform signals is less than or equal to a second threshold value.

8. The printing apparatus according to claim 1, further comprising, an amplifier configured to amplify the first basic analog synthesis signal generated by the first digital synthesizer, wherein a number of pieces of the digital data synthesized in the first digital synthesizer is determined based on load acting on the amplifier.

9. The printing apparatus according to claim 8, wherein the load acting on the amplifier is determined based on a frequency bandwidth of the amplifier, and wherein, when the frequency bandwidth of the amplifier is a same as or narrower than a particular frequency bandwidth, the number of pieces of the digital data synthesized in the first digital synthesizer is reduced compared to a case where the frequency bandwidth of the amplifier is wider than the particular frequency bandwidth.

10. The printing apparatus according to claim 8, wherein:

the n pieces of the digital data includes at least one of a first digital data and a second digital data;

the first digital data is constituted by a first data element;

the second digital data is constituted by a second data element;

the first basic analog synthesis signal is constituted by arranging the first data element and the second data element in such a manner that the first data element and the second data element are adjacent to each other over time;

the load acting on the amplifier is determined based on an amplitude of the first data element and an amplitude of the second data element; and when difference between the amplitude of the first data element and the amplitude of the second data element is larger than or equal to a particular value, the number of pieces of the digital data synthesized in the first digital synthesizer is reduced compared to a case where difference between the amplitude of the first data element and the amplitude of the second data element is less than the particular value.

11. The printing apparatus according to claim 1, wherein a number of pieces of the digital data synthesized in the first digital synthesizer is determined based on a usage frequency of the digital data, wherein the number of pieces of digital data synthesized in the first digital synthesizer is reduced when the digital data includes digital data of which the usage frequency is equal to or greater than a third threshold, compared to a case where the digital data does not include digital data of which the usage frequency is equal to or greater than the third threshold.

12. The printing apparatus according to claim 1, wherein, when the digital data synthesized in the first digital synthesizer includes high precision digital data for high-precision printing, a number of digital data synthesized in the first digital synthesizer is reduced compared to a case where the digital data does not include the high precision digital data.

13. The printing apparatus according to claim 1, wherein:

the n pieces of the digital data includes at least one of a first digital data and a second digital data;

the first digital data is constituted by a first data element;

the second digital data is constituted by a second data element;

the first basic analog synthesis signal is constituted by arranging the first data element and the second data element in such a manner that the first data element and the second data element are adjacent to each other over time; and when difference between the amplitude of the first data element and the amplitude of the second data element is larger than or equal to a particular value, an amplifier with a higher frequency bandwidth is used to amplify the first basic analog synthesis signal compared to a case where difference between the amplitude of the first data element and the amplitude of the second data element is less than the particular value.

14. The printing apparatus according to claim 1, wherein, when the digital data synthesized in the first digital synthesizer includes digital data of which a usage frequency is higher than or equal to a fourth threshold, an amplifier with a higher frequency bandwidth is used to amplify the first basic analog synthesis signal compared to a case where the usage frequency does not include digital data of which the usage frequency is higher than or equal to the fourth threshold.

15. The printing apparatus according to claim 1, wherein, when the digital data synthesized in the first digital synthesizer includes high precision digital data for high-precision printing, an amplifier with a higher frequency bandwidth is used to amplify the first basic analog synthesis signal compared to a case where the digital data does not include the high precision digital data.

16. The printing apparatus according to claim 1, wherein, when the digital data synthesized in the first digital synthesizer includes high precision digital data for high-precision printing, the first digital synthesizer does not synthesize the digital data other than the high precision digital data.

17. The printing apparatus according to claim 1, wherein the first digital synthesizer is configured to synthesize the n pieces of digital data at a first frequency in, and wherein the integrated signal synthesizer is configured to synthesize the first basic analog synthesis signal and an analog waveform signal at a second frequency higher than the first frequency.

18. The printing apparatus according to claim 1, wherein the first digital synthesizer is configured to synthesize the n pieces of digital data at a third frequency in, and wherein the integrated signal synthesizer is configured to synthesize the first basic analog synthesis signal and the one or more analog waveform signals at a fourth frequency lower than the third frequency.

* * * * *